US012611913B2

(12) United States Patent
Hirata et al.

(10) Patent No.: US 12,611,913 B2
(45) Date of Patent: Apr. 28, 2026

(54) COMPARTMENT AIR-CONDITIONING APPARATUS, REFRIGERATION APPARATUS, AND TRANSPORT CONTAINER

(71) Applicant: DAIKIN INDUSTRIES, LTD., Osaka (JP)

(72) Inventors: Wataru Hirata, Osaka (JP); Noritaka Kamei, Osaka (JP); Kento Shibuya, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 99 days.

(21) Appl. No.: 18/619,456

(22) Filed: Mar. 28, 2024

(65) Prior Publication Data

US 2024/0239152 A1 Jul. 18, 2024

Related U.S. Application Data

(63) Continuation of application No. PCT/JP2022/030041, filed on Aug. 5, 2022.

(30) Foreign Application Priority Data

Sep. 29, 2021 (JP) ................................ 2021-158934

(51) Int. Cl.
*B60H 1/00* (2006.01)
*B65D 88/74* (2006.01)
(Continued)

(52) U.S. Cl.
CPC ....... *B60H 1/00849* (2013.01); *B65D 88/745* (2013.01); *F25D 11/003* (2013.01); *F25D 17/042* (2013.01); *B65D 2588/746* (2013.01)

(58) Field of Classification Search
CPC .............. B60H 1/00849; B65D 88/745; B65D 2588/746; F25D 11/003; F25D 17/042
See application file for complete search history.

(56) References Cited

U.S. PATENT DOCUMENTS

2020/0253227 A1 8/2020 Kamei et al.
2021/0033295 A1 2/2021 Kamei et al.
2021/0263492 A1 8/2021 Kamei et al.

FOREIGN PATENT DOCUMENTS

EP 3 054 244 A1 8/2016
JP 2019-66169 A 4/2019
(Continued)

OTHER PUBLICATIONS

International Preliminary Report on Patentability and English translation of the Written Opinion of the International Searching Authority for International Application No. PCT/JP2022/030041, dated Apr. 11, 2024.
(Continued)

*Primary Examiner* — Jonathan Bradford
(74) *Attorney, Agent, or Firm* — Birch, Stewart, Kolasch & Birch, LLP

(57) ABSTRACT

An inside air control apparatus includes a composition adjuster. Outside air flowing in a first inflow path and inside air flowing in a second inflow path flow into the composition adjuster as the air to be treated. The composition adjuster separates the air to be treated into first air and second air. The first air flows into a first outflow path. The second air flows into a second outflow path. An outlet switching mechanism changes the destinations of the first air and the second air.

10 Claims, 16 Drawing Sheets

(51) Int. Cl.
*F25D 11/00* (2006.01)
*F25D 17/04* (2006.01)

(56) References Cited

FOREIGN PATENT DOCUMENTS

| | | | | |
|---|---|---|---|---|
| WO | WO 2019/216312 A1 | | 11/2019 | |
| WO | WO-2020100515 A1 | * | 5/2020 | ........... G01N 33/007 |

OTHER PUBLICATIONS

Extended European Search Report for European Application No. 22875596.3, dated Nov. 15, 2024.
International Search Report for PCT/JP2022/030041 (PCT/ISA/210) mailed on Oct. 11, 2022.

* cited by examiner

COMPARTMENT AIR-CONDITIONING APPARATUS, REFRIGERATION APPARATUS, AND TRANSPORT CONTAINER

CROSS REFERENCE TO RELATED APPLICATIONS

This application is a Continuation of PCT International Application No. PCT/JP2022/030041 filed on Aug. 5, 2022, which claims priority under 35 U.S.C. § 119 (a) to Patent Application No. 2021-158934 filed in Japan on Sep. 29, 2021, all of which are hereby expressly incorporated by reference into the present application.

TECHNICAL FIELD

The present disclosure relates to an inside air control apparatus, a refrigeration apparatus, and a transport container.

BACKGROUND ART

Patent Document 1 discloses an inside air control apparatus that adjusts the composition of inside air in a storage. This inside air control apparatus adjusts the oxygen concentration and the like of the inside air to maintain the freshness of perishable items stored in the storage.

The inside air control apparatus of Patent Document 1 includes a first composition adjuster and a second composition adjuster. The first composition adjuster supplies, to the storage, supply air generated by adjusting the composition of outside air. The second composition adjuster supplies, to the storage, supply air generated by adjusting the composition of the inside air.

CITATION LIST

Patent Document

Patent Document 1: Japanese Unexamined Patent Publication No. 2019-66169

SUMMARY

A first aspect of the present disclosure is directed to an inside air control apparatus (100) for adjusting the composition of inside air in a storage (2), including: a composition adjuster (200) configured to separate inflow air to be treated into first air and second air having different compositions; a first inflow path (111) in which outside air outside the storage (2) flows toward the composition adjuster (200); a second inflow path (112) in which the inside air flows toward the composition adjuster (200); a first outflow path (131) in which the first air having flowed out from the composition adjuster (200) flows; a second outflow path (132) in which the second air having flowed out from the composition adjuster (200) flows; and an outlet switching mechanism (135) configured to switch between a state where the first outflow path (131) communicates with an inside of the storage (2) and the second outflow path (132) communicates with an outside of the storage (2) and a state where the second outflow path (132) communicates with the inside of the storage (2) and the first outflow path (131) communicates with the outside of the storage (2).

DESCRIPTION OF EMBODIMENTS

Hereinafter, embodiments of the present disclosure will be described with reference to the drawings.

First Embodiment

The present disclosure relates to a transport container (1). The transport container (1) is a reefer container capable of controlling an internal temperature. The transport container (1) is used to transport fresh products (e.g., fruits, vegetables, and flowers and ornamental plants) which breathe by absorbing oxygen (02) in the air and releasing carbon dioxide ($CO_2$) into the air.

Figure 1:
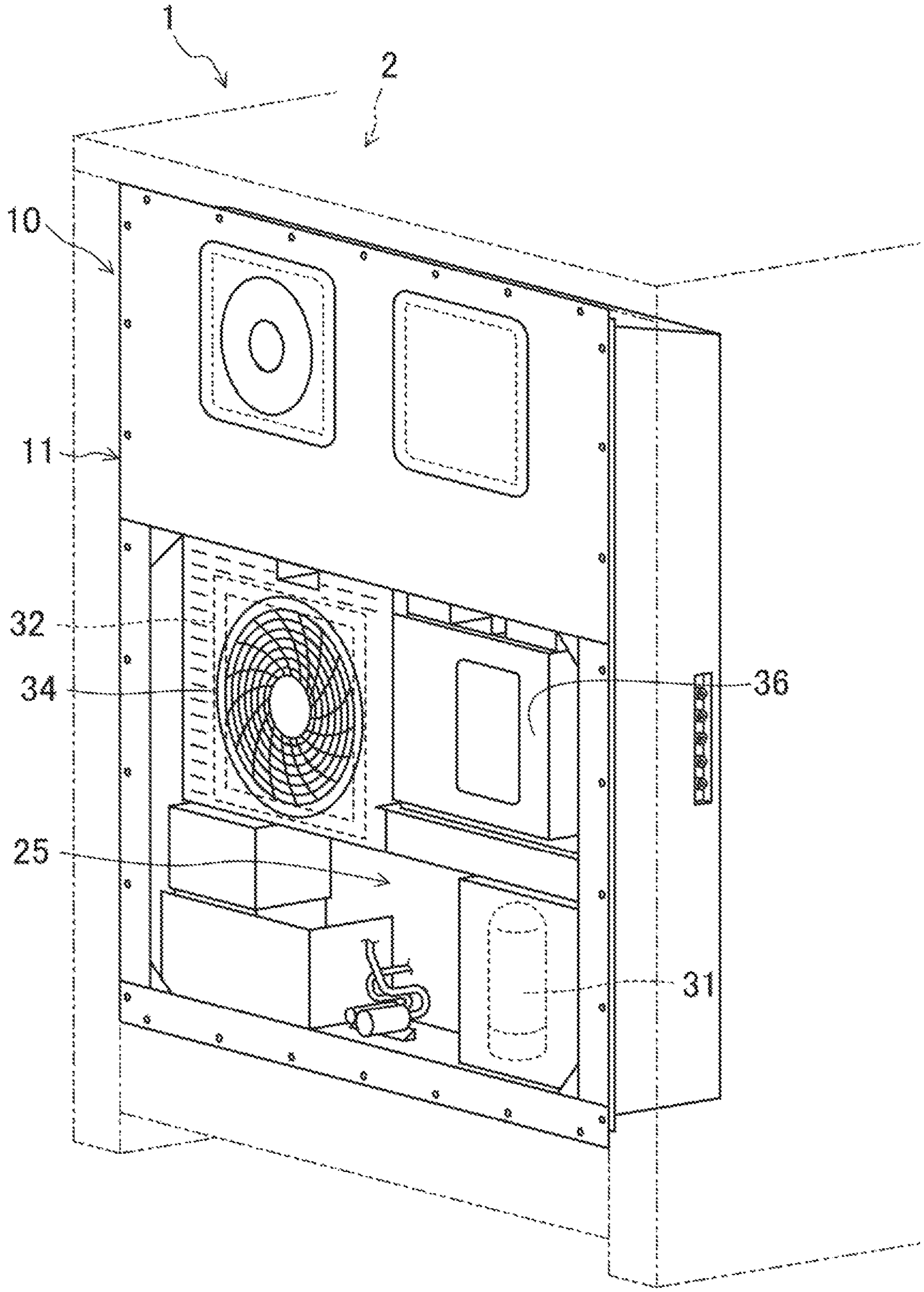
FIG. 1 is a perspective view showing a front side of a transport container of a first embodiment.

As illustrated in FIG. 1, the transport container (1) includes a container body (2) and a transport refrigeration apparatus (10) provided in the container body (2). The transport container (1) is used for marine transportation. The transport container (1) is conveyed by a marine transporter such as a ship.

—Container Body—

The container body (2) is a storage for storing the above fresh products.

The container body (2) has a hollow box shape. The container body (2) is formed to be horizontally long. The container body (2) has an opening formed at one end in the longitudinal direction. The opening of the container body (2) is closed by the transport refrigeration apparatus (10). In the container body (2), a storage space (5) for storing products to be transported is formed.

—Transport Refrigeration Apparatus—

The transport refrigeration apparatus (10) is attached to the opening of the container body (2). The transport refrigeration apparatus (10) includes a casing (11) and a refrigerant circuit (30). The transport refrigeration apparatus (10) adjusts the temperature of air in the storage space (5) (the inside air).

<Casing>

Figure 2:
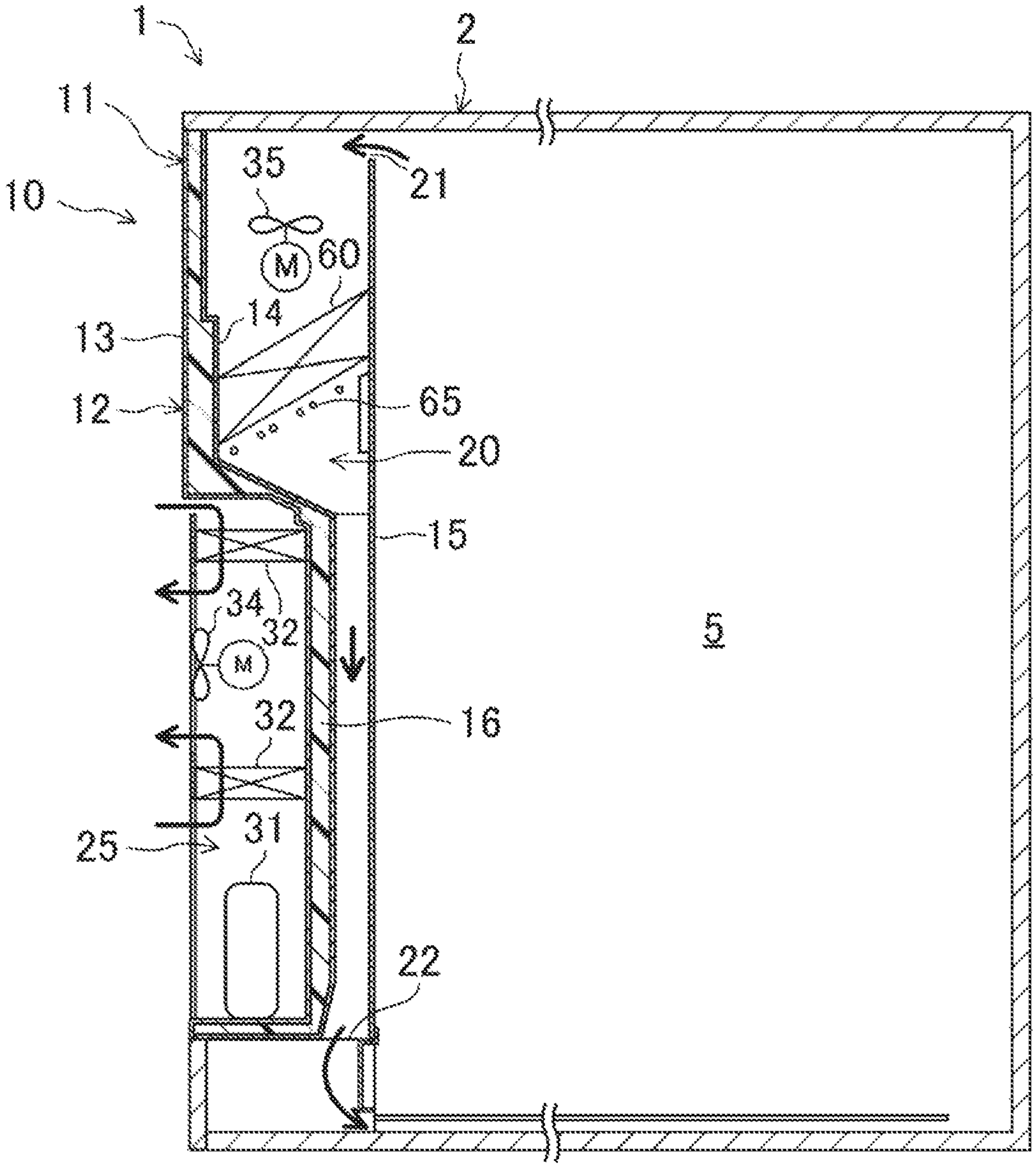
FIG. 2 is a longitudinal sectional view schematically showing an internal structure of the transport container of the first embodiment.

As schematically illustrated in FIG. 2, the casing (11) includes a division wall (12) and a partition plate (15).

An internal flow path (20) is formed inside the division wall (12). An external chamber (25) is formed outside the division wall (12). The internal flow path (20) and the external chamber (25) are separated by the division wall (12).

The division wall (12) includes an external wall (13) and an internal wall (14). The external wall (13) is located outside the container body (2). The internal wall (14) is located inside the container body (2).

The external wall (13) closes the opening of the container body (2). The external wall (13) is attached to a peripheral portion of the opening of the container body (2). The external wall (13) has a lower portion extruded toward the inside of the container body (2). The external chamber (25) is formed inside the extruded external wall (13).

The internal wall (14) faces the external wall (13). The internal wall (14) is shaped along the external wall (13). The internal wall (14) is spaced apart from the external wall (13). A thermal insulator (16) is provided between the internal wall (14) and the external wall (13).

The partition plate (15) is arranged further inward of the container body (2) than the internal wall (14). The internal flow path (20) is formed between the division wall (12) and the partition plate (15). An inflow port (21) is formed between the upper end of the partition plate (15) and a top panel of the container body (2). An outflow port (22) is formed between the lower end of the partition plate (15) and the lower end of the division wall (12). The internal flow path (20) extends from the inflow port (21) to the outflow port (22).

<Components of Refrigerant Circuit>

The refrigerant circuit (30) is filled with a refrigerant. The refrigerant circuit (30), where a refrigerant circulates, performs a vapor compression refrigeration cycle. The refrigerant circuit (30) includes a compressor (31), an external heat exchanger (32), an expansion valve (33), an internal heat exchanger (60), and a refrigerant pipe connecting these components.

The compressor (31) is arranged in a lower portion of the external chamber (25). The external heat exchanger (32) is arranged in an upper portion of the external chamber (25). The external heat exchanger (32) is a fin-and-tube heat exchanger that exchanges heat between a refrigerant and outside air. The external heat exchanger (32) has a generally rectangular tubular shape. The internal heat exchanger (60) is arranged in the internal flow path (20). The internal heat exchanger (60) is a fin-and-tube heat exchanger that exchanges heat between a refrigerant and inside air.

<External Fan>

The transport refrigeration apparatus (10) includes a single external fan (34). The external fan (34) is a propeller fan. The external fan (34) is arranged in the external chamber (25). The external fan (34) is arranged inside the external heat exchanger (32) having a tubular shape. The external fan (34) sends outside air to the external heat exchanger (32).

<Internal Fan>

The transport refrigeration apparatus (10) includes two internal fans (35). The internal fans (35) are propeller fans. The internal fans (35) are arranged in the internal flow path (20). The internal fans (35) are arranged above the internal heat exchanger (60). The internal fans (35) send inside air to the internal heat exchanger (60).

<Heater>

The transport refrigeration apparatus (10) includes a heater (65). The heater (65) is arranged below the internal heat exchanger (60). The heater (65) is used to defrost the internal heat exchanger (60).

<Electric Component Box>

As illustrated in FIG. 1, the transport refrigeration apparatus (10) has an electric component box (36). The electric component box (36) is arranged in an upper portion of the external chamber (25). The electric component box (36) houses electric components such as an inverter board and a control board.

—Configuration of Refrigerant Circuit—

Figure 3:
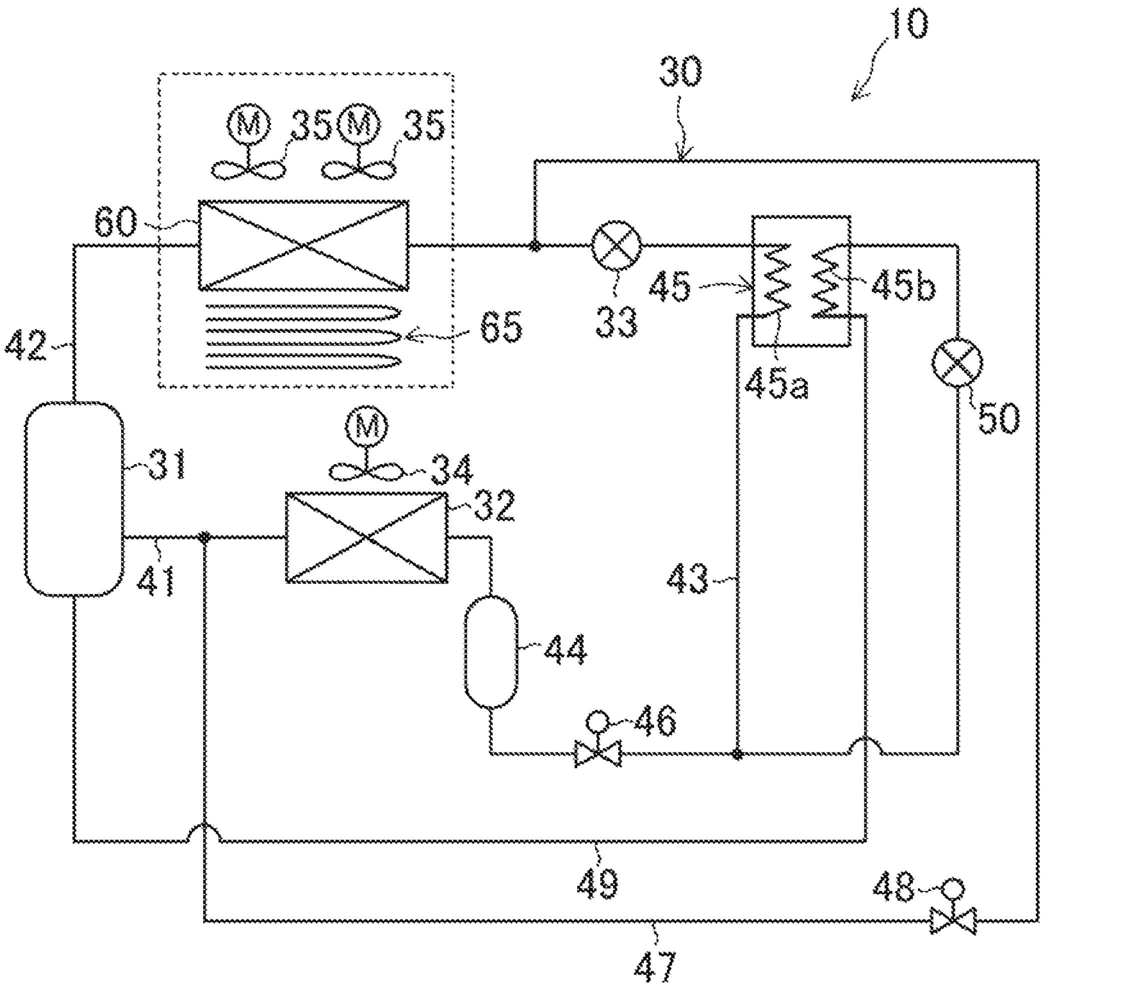
FIG. 3 is a piping system diagram of a refrigerant circuit of a transport refrigeration apparatus of the first embodiment.

The configuration of the refrigerant circuit (30) will be described with reference to FIG. 3.

The refrigerant circuit (30) has, as main components, the compressor (31), the external heat exchanger (32), the expansion valve (33), and the internal heat exchanger (60). The expansion valve (33) is an electronic expansion valve having a variable opening degree.

The refrigerant circuit (30) has a discharge pipe (41) and a suction pipe (42). One end of the discharge pipe (41) is connected to a discharge portion of the compressor (31). The other end of the discharge pipe (41) is connected to a gas end of the external heat exchanger (32). One end of the suction pipe (42) is connected to a suction portion of the compressor (31). The other end of the suction pipe (42) is connected to a gas end of the internal heat exchanger (60).

The refrigerant circuit (30) has a liquid pipe (43), a receiver (44), a cooling heat exchanger (45), a first on-off valve (46), a connecting pipe (47), a second on-off valve (48), an injection pipe (49), and an injection valve (50).

One end of the liquid pipe (43) is connected to a liquid end of the external heat exchanger (32). The other end of the liquid pipe (43) is connected to a liquid end of the internal heat exchanger (60). The receiver (44) is provided in the liquid pipe (43). The receiver (44) is a container that stores a refrigerant.

The cooling heat exchanger (45) has a first flow path (45*a*) and a second flow path (45*b*). The cooling heat exchanger (45) exchanges heat between a refrigerant in the first flow path (45*a*) and a refrigerant in the second flow path (45*b*). The cooling heat exchanger (45) is, for example, a plate heat exchanger. The first flow path (45*a*) is arranged in the middle of the liquid pipe (43). The second flow path (45*b*) is arranged in the middle of the injection pipe (49). The cooling heat exchanger (45) cools a refrigerant flowing in the liquid pipe (43).

The first on-off valve (46) is arranged in the liquid pipe (43) between the receiver (44) and the first flow path (45*a*). The first on-off valve (46) is an electromagnetic valve that can be opened and closed.

The connecting pipe (47) allows a high-pressure line and a low-pressure line of the refrigerant circuit (30) to communicate with each other. One end of the connecting pipe (47) is connected to the discharge pipe (41). The other end of the connecting pipe (47) is connected to the liquid pipe (43) between the expansion valve (33) and the internal heat exchanger (60).

The second on-off valve (48) is provided in the connecting pipe (47). The second on-off valve (48) is an electromagnetic valve that can be opened and closed.

The injection pipe (49) introduces a refrigerant into an intermediate-pressure portion of the compressor (31). One end of the injection pipe (49) is connected to the liquid pipe (43) between the receiver (44) and the first flow path (45*a*). The other end of the injection pipe (49) is connected to the intermediate-pressure portion of the compressor (31). An intermediate pressure, which is the pressure of the intermediate-pressure portion, is a pressure higher than the suction pressure and lower than the discharge pressure of the compressor (31).

The injection valve (50) is provided upstream of the second flow path (45*b*) in the injection pipe (49). The injection valve (50) is an electronic expansion valve having a variable opening degree.

—Operation of Transport Refrigeration Apparatus—

A basic operation of the transport refrigeration apparatus (10) will be described below. When the transport refrigeration apparatus (10) is in operation, the compressor (31), the external fan (34), and the internal fans (35) operate. The first on-off valve (46) is opened. The second on-off valve (48) is closed. The opening degree of the expansion valve (33) is adjusted. The opening degree of the injection valve (50) is adjusted.

The refrigerant compressed by the compressor (31) flows in the external heat exchanger (32). In the external heat exchanger (32), the refrigerant dissipates heat to the outside air to condense. The condensed refrigerant passes through the receiver (44). Part of the refrigerant having passed through the receiver (44) flows in the first flow path (45*a*) of the cooling heat exchanger (45). The remaining part of the refrigerant having passed through the receiver (44) flows in the injection pipe (49), and is decompressed to the intermediate pressure by the injection valve (50). The decompressed refrigerant is introduced into the intermediate-pressure portion of the compressor (31).

In the cooling heat exchanger (45), the refrigerant in the second flow path (45*b*) absorbs heat from the refrigerant in the first flow path (45*a*) to evaporate. This cools the refrigerant in the first flow path (45*a*). In other words, the degree of subcooling of the refrigerant flowing in the first flow path (45*a*) increases.

The refrigerant cooled in the cooling heat exchanger (45) is decompressed to a low pressure by the expansion valve (33). The decompressed refrigerant flows in the internal heat exchanger (60). In the internal heat exchanger (60), the refrigerant absorbs heat from the inside air to evaporate. Thus, the internal heat exchanger (60) cools the inside air. The evaporated refrigerant is sucked into the compressor (31) and compressed again.

The inside air in the container body (2) circulates between the storage space (5) and the internal flow path (20). In the internal flow path (20), the internal heat exchanger (60) cools the inside air. Thus, the inside air in the storage space (5) can be cooled and adjusted to a predetermined temperature.

—Inside Air Control Apparatus—

The transport refrigeration apparatus (10) of this embodiment includes an inside air control apparatus (100).

The inside air control apparatus (100) is provided in the transport refrigeration apparatus (10) to provide so-called controlled atmosphere (CA) transportation. The inside air control apparatus (100) adjusts the composition of air in the storage space (5) of the transport container (1) so that the composition of the air is different from that of the atmospheric air.

Figure 4:
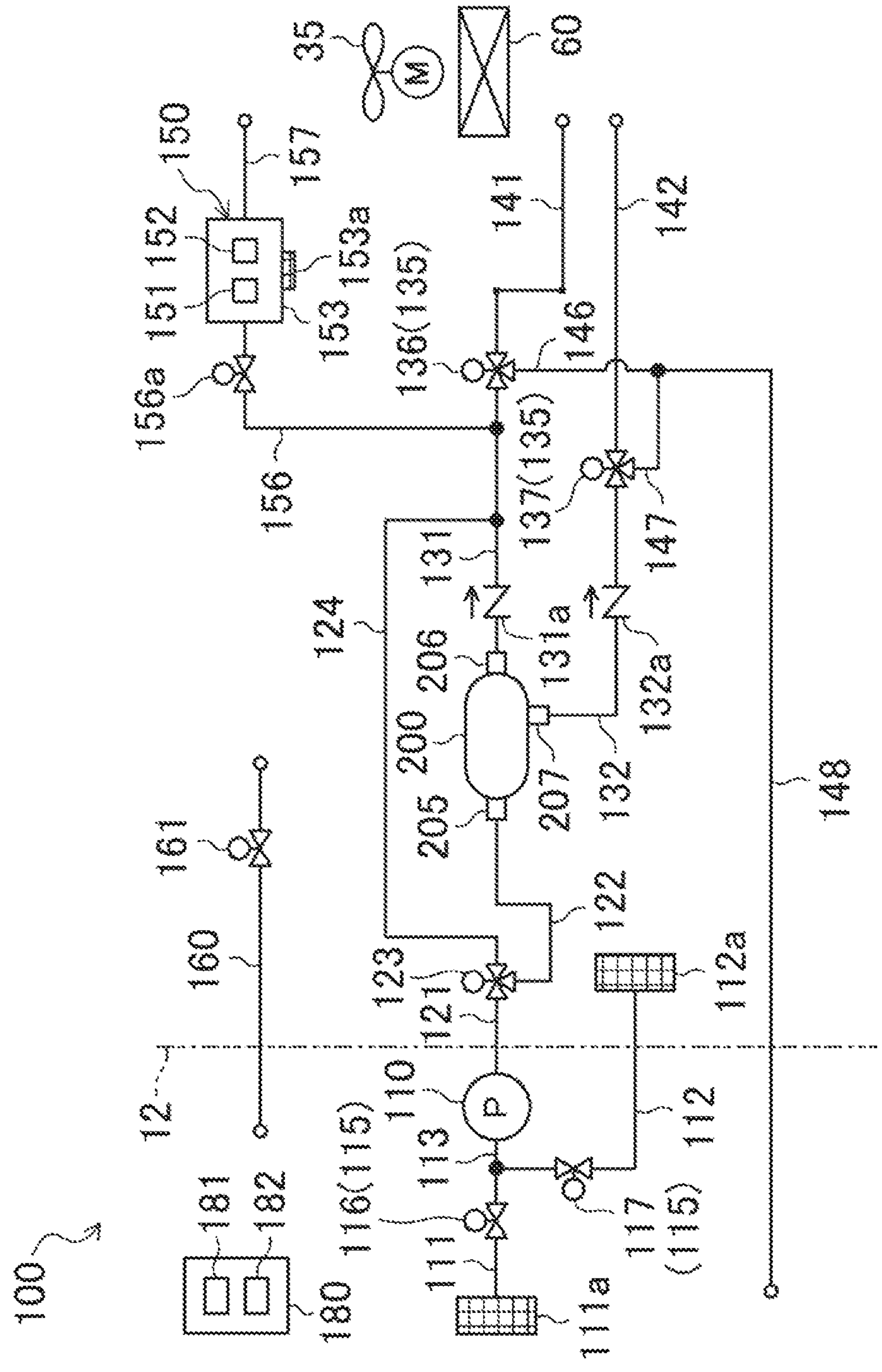
FIG. 4 is a piping system diagram showing a configuration of an inside air control apparatus of the first embodiment.

As illustrated in FIG. 4, the inside air control apparatus (100) includes an air pump (110), a separation module (200), a sensor unit (150), a ventilation exhaust pipe (160), and a controller (180).

The air pump (110) and the controller (180) are installed in the external chamber (25) of the transport refrigeration apparatus (10). The separation module (200) and the sensor unit (150) are installed inside the division wall (12) (or, in the inner side) of the transport refrigeration apparatus (10).

The air pump (110), the separation module (200), and the sensor unit (150) are connected with a pipe in which air flows. The pipe connected to these components and the ventilation exhaust pipe (160) may be rigid pipes, may be flexible hoses, or may be a combination of a pipe and a hose.

<Air Pump>

The air pump (110) compresses the air sucked in from a suction port, and discharges the compressed air from a discharge port. The air pump (110) is an air supply that sends the sucked air to the separation module (200).

<Separation Module>

The separation module (200) is a composition adjuster that separates the inflow air to be treated into first air and second air each having compositions. As will be described in detail later, the separation module (200) includes an inlet port (205) from which the air to be treated flows in, a first outlet port (206) from which the first air flows out, and a second outlet port (207) from which the second air flows out.

<Inflow Pipe>

The inside air control apparatus (100) includes a first inflow pipe (111), a second inflow pipe (112), and an inflow trunk pipe (113).

The first inflow pipe (111) has an inlet end opening to the outside of the division wall (12) (the external space). The first inflow pipe (111) is a first inflow path for sending the air outside the transport container (1) (the outside air) to the air pump (110). The inlet end of the first inflow pipe (111) is provided with an air filter (111*a*). The air filter (111*a*) is a membrane filter for capturing dust, salt, and the like contained in the outside air.

The second inflow pipe (112) has an inlet end opening to the inside of the division wall (12) (the internal space). The second inflow pipe (112) is a second inflow path for sending the air inside the transport container (1) (the inside air) to the air pump (110). The inlet end of the second inflow pipe (112) is provided with an air filter (112*a*). The air filter (112*a*) is a membrane filter for capturing dust and the like contained in the inside air.

The inflow trunk pipe (113) has an inlet end connected to an outlet end of the first inflow pipe (111) and an outlet end of the second inflow pipe (112). The inflow trunk pipe (113) has an outlet end connected to the suction port of the air pump (110).

The first inflow pipe (111) is provided with a first valve (116). The second inflow pipe (112) is provided with a second valve (117). The first valve (116) and the second valve (117) are electromagnetic valves. The first valve (116) allows or stops the flow of the outside air in the first inflow pipe (111). The second valve (117) allows or stops the flow of the inside air in the second inflow pipe (112). The first valve (116) and the second valve (117) constitute an inlet switching mechanism (115) for selectively allowing one or both of the outside air and the inside air to flow into the air pump (110).

<Connection Pipe, Bypass Switching Valve, and Bypass Pipe>

The inside air control apparatus (100) includes a first connection pipe (121), a second connection pipe (122), a bypass switching valve (123), and a bypass pipe (124).

The first connection pipe (121) has an inlet end connected to the discharge port of the air pump (110) and an outlet end connected to the bypass switching valve (123). The second connection pipe (122) has an inlet end connected to the bypass switching valve (123) and an outlet end connected to the inlet port (205) of the separation module (200).

The bypass pipe (124) has an inlet end connected to the bypass switching valve (123) and an outlet end connected to a first outflow pipe (131) described later. The bypass pipe (124) is a pipe in which the air discharged from the air pump (110) flows to bypass the separation module (200).

The bypass switching valve (123) is a three-way valve connected with the first connection pipe (121), the second connection pipe (122), and the bypass pipe (124). The bypass switching valve (123) switches between a first state where the first connection pipe (121) communicates with the second connection pipe (122) and is disconnected from the bypass pipe (124) and a second state where the first connection pipe (121) communicates with the bypass pipe (124) and is disconnected from the second connection pipe (122).

<Outflow Pipe>

The inside air control apparatus (100) includes the first outflow pipe (131) and a second outflow pipe (132).

The first outflow pipe (131) has an inlet end connected to the first outlet port (206) of the separation module (200) and an outlet end connected to a first switching valve (136) described later. The first outflow pipe (131) is a first outflow path in which the first air having flowed out from the separation module (200) flows. The first outflow pipe (131) is provided with a first check valve (131*a*). The first check valve (131*a*) allows the air to flow in the direction of flow from the separation module (200), and prevents the air from flowing in the reverse direction. The outlet end of the bypass pipe (124) is connected to the first outflow pipe (131) downstream of the first check valve (131*a*).

The second outflow pipe (132) has an inlet end connected to the second outlet port (207) of the separation module (200) and an outlet end connected to a second switching valve (137) described later. The second outflow pipe (132) is a second outflow path in which the second air having flowed out from the separation module (200) flows. The second outflow pipe (132) is provided with a second check valve (132*a*). The second check valve (132*a*) allows the air to flow in the direction of flow from the separation module (200), and prevents the air from flowing in the reverse direction.

<Supply Pipe, Discharge Pipe, and Switching Valve>

The inside air control apparatus (100) includes a first supply pipe (141), a second supply pipe (142), a first discharge pipe (146), a second discharge pipe (147), a discharge trunk pipe (148), the first switching valve (136), and the second switching valve (137).

The first supply pipe (141) has an inlet end connected to the first switching valve (136) and an outlet end opening downstream of the internal fan (35) in the internal flow path (20). The first supply pipe (141) is a pipe for supplying the first air to the storage space (5). The second supply pipe (142) has an inlet end connected to the second switching valve (137) and an outlet end opening downstream of the internal fan (35) in the internal flow path (20). The second supply pipe (142) is a pipe for supplying the second air to the storage space (5).

The first discharge pipe (146) has an inlet end connected to the first switching valve (136) and an outlet end connected to the discharge trunk pipe (148). The first discharge pipe (146) is a pipe for discharging the first air to the external space. The second discharge pipe (147) has an inlet end connected to the second switching valve (137) and an outlet end connected to the discharge trunk pipe (148). The second discharge pipe (147) is a pipe for discharging the second air to the external space. The discharge trunk pipe (148) has an inlet end connected to the first discharge pipe (146) and the second discharge pipe (147). The discharge trunk pipe (148) has an outlet end opening to the external space outside the division wall (12).

The first switching valve (136) is a three-way valve connected with the first outflow pipe (131), the first supply pipe (141), and the first discharge pipe (146). The first switching valve (136) switches between a first state where the first outflow pipe (131) communicates with the first supply pipe (141) and is disconnected from the first discharge pipe (146) and a second state where the first outflow pipe (131) communicates with the first discharge pipe (146) and is disconnected from the first supply pipe (141).

The second switching valve (137) is a three-way valve connected with the second outflow pipe (132), the second supply pipe (142), and the second discharge pipe (147). The second switching valve (137) switches between a first state where the second outflow pipe (132) communicates with the second supply pipe (142) and is disconnected from the second discharge pipe (147) and a second state where the second outflow pipe (132) communicates with the second discharge pipe (147) and is disconnected from the second supply pipe (142).

The first switching valve (136) and the second switching valve (137) constitute an outlet switching mechanism for switching between a state where the first outflow pipe (131) communicates with the internal flow path (20) and the second outflow pipe (132) communicates with the external space and a state where the second outflow pipe (132) communicates with the internal flow path (20) and the first outflow pipe (131) communicates with the external space.

<Sensor Unit>

The sensor unit (150) includes an oxygen sensor (151), a carbon dioxide sensor (152), and a sensor case (153).

The oxygen sensor (151) is a sensor of zirconia current type that measures the oxygen concentration of mixed gas such as air. The carbon dioxide sensor (152) is a non-dispersive infrared (NDIR) sensor that measures the carbon dioxide concentration of the mixed gas such as air. The oxygen sensor (151) and the carbon dioxide sensor (152) are housed in the sensor case (153).

The sensor case (153) is a box-shaped member. The sensor case (153) includes an air filter (153*a*). The air filter (153*a*) is a membrane filter for capturing dust etc. contained in the inside air. The air filter (153*a*) filters the inside air flowing into the sensor case (153).

The sensor case (153) is connected with a measurement pipe (156) and an outlet pipe (157). The measurement pipe (156) has an inlet end connected to the first outflow pipe (131) downstream of the first check valve (131*a*) and an outlet end connected to the sensor case (153).

The measurement pipe (156) is provided with a measurement on-off valve (156*a*). The measurement on-off valve (156*a*) is an electromagnetic valve. The outlet pipe (157) has an inlet end connected to the sensor case (153) and an outlet end opening upstream of the internal fan (35) in the internal flow path (20).

<Ventilation Exhaust Pipe>

A ventilation exhaust pipe (160) is a pipe for discharging the air in the transport container (1) to the external space. The ventilation exhaust pipe (160) penetrates the division wall (12) of the transport refrigeration apparatus (10). The ventilation exhaust pipe (160) is provided with an exhaust valve (161). The exhaust valve (161) is an electromagnetic valve.

<Controller>

The controller (180) includes a microcomputer (181) mounted on a control board and a memory device (182) storing software for operating the microcomputer (181). The memory device (182) is a semiconductor memory. The controller (180) controls the components of the inside air control apparatus (100). For example, the controller (180) opens and closes the first valve (116) and the second valve (117) constituting the inlet switching mechanism (115) individually, and switches the first switching valve (136) and the second switching valve (137) constituting the outlet switching mechanism (135) individually.

—Structure of Separation Module—

Figure 5:
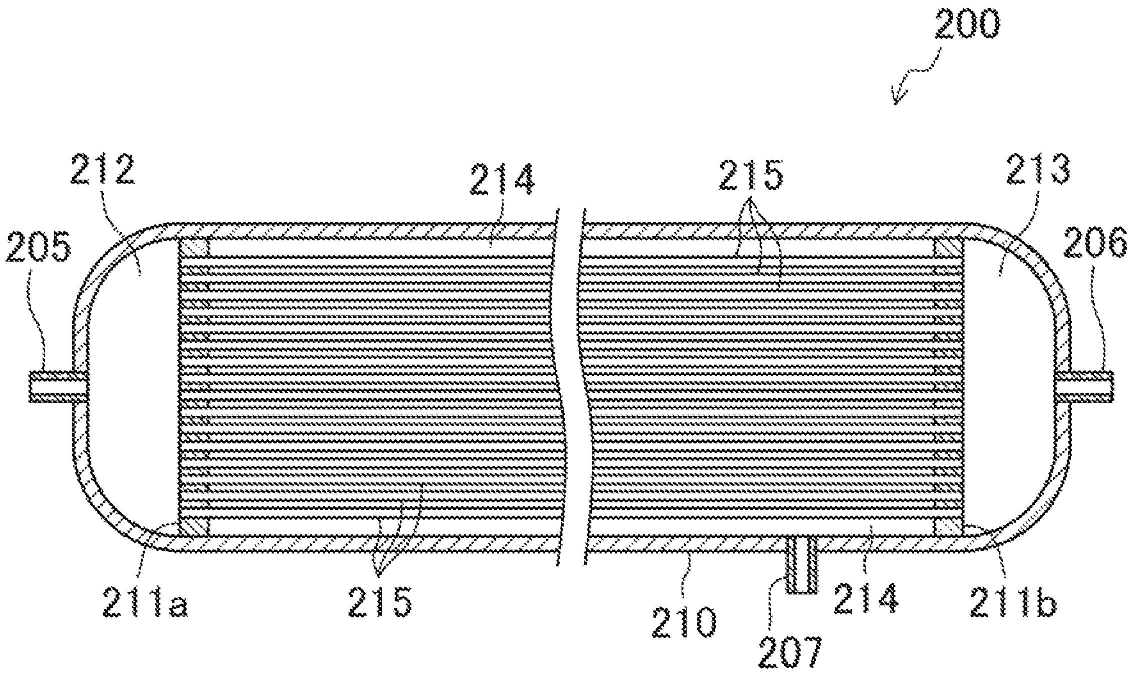
FIG. 5 is a schematic sectional view of a separation module provided in the inside air control apparatus of the first embodiment.

The structure of the separation module (200) will be described with reference to FIG. 5.

The separation module (200) includes a single cylindrical case (210) and two partition walls (211*a*, 211*b*). The cylindrical case (210) is an elongated cylindrical container having ends, both of which are closed. The partition walls (211*a*, 211*b*) are members for partitioning the internal space of the cylindrical case (210), and cross the internal space of the cylindrical case (210).

The partition walls (211*a*, 211*b*) are arranged near one end and the other end of the internal space of the cylindrical case (210), respectively. In FIG. 5, the internal space of the cylindrical case (210) is partitioned into an introduction chamber (212) located on the left side of the left partition wall (211*a*), a secondary exhaust chamber (214) located between the two partition walls (211*a*, 211*b*), and a primary exhaust chamber (213) located on the right side of the right partition wall (211*b*).

The separation module (200) includes many gas separation membranes (215) having a shape of hollow fibers (i.e., very thin tubes with an outer diameter of 1 mm or less). The gas separation membranes (215) having a shape of hollow fibers extend from the partition wall (211*a*) on one side to the partition wall (211*b*) on the other side. Each gas separation membrane (215) has end portions, one of which penetrates the partition wall (211*a*) on one side and opens to the introduction chamber (212), and the other one of which penetrates the other partition wall (211*b*) and opens to the primary exhaust chamber (213).

The internal space of the cylindrical case (210) has a portion located between the two partition walls (211*a*, 211*b*) and outside the gas separation membranes (215) and serving as the secondary exhaust chamber (214). In the separation module (200), the introduction chamber (212) and the primary exhaust chamber (213) communicate with each other through the gas separation membranes (215) having a shape of hollow fibers, whereas the secondary exhaust chamber (214) does not communicate with the spaces inside the gas separation membranes (215), the introduction chamber (212), and the primary exhaust chamber (213).

The cylindrical case (210) is provided with the inlet port (205), the first outlet port (206), and the second outlet port (207). The inlet port (205) is arranged at a left end portion of the cylindrical case (210) in FIG. 5, and communicates with the introduction chamber (212). The first outlet port (206) is arranged at a right end portion of the cylindrical case (210) in FIG. 5, and communicates with the primary exhaust chamber (213). The second outlet port (207) is arranged at a longitudinally middle portion of the cylindrical case (210), and communicates with the secondary exhaust chamber (214).

The gas separation membranes (215) are non-porous membranes made of a polymer. The gas separation membranes (215) separate components contained in mixed gas from one another, using that each substance has its own rate (permeation rate) at which molecules permeate the gas separation membranes (215).

The permeation rate of nitrogen through the gas separation membranes (215) is lower than the permeation rates of both oxygen and carbon dioxide. The many gas separation membranes (215) having a shape of hollow fibers have substantially the same thickness. Thus, the permeability of nitrogen through the gas separation membranes (215) of the separation module (200) is lower than the permeabilities of both oxygen and carbon dioxide.

In the separation module (200), the air to be treated which has flowed into the introduction chamber (212) through the inlet port (205) flows through the spaces inside the gas separation membranes (215) having a shape of hollow fibers toward the primary exhaust chamber (213). The air flows through the spaces inside the gas separation membranes (215), part of which permeates the gas separation membranes (215) and then moves to the secondary exhaust chamber (214), and the remaining part of which flows into the primary exhaust chamber (213).

The permeability of nitrogen through the gas separation membranes (215) of the separation module (200) is lower than the permeabilities of oxygen and carbon dioxide. In other words, nitrogen is less likely to permeate the gas separation membranes (215) than oxygen and carbon dioxide. Thus, as the air flowing inside the gas separation membranes (215) having a shape of hollow fibers approaches the primary exhaust chamber (213), the nitrogen concentration of the air increases and the oxygen and carbon dioxide concentrations thereof decrease. The air flowing through the gas separation membranes (215) having a shape of hollow fibers contains oxygen and carbon dioxide which permeate the gas separation membranes (215) and then move to the secondary exhaust chamber (214).

As a result, the air having flowed into the primary exhaust chamber (213) without permeating the gas separation membranes (215) has a higher nitrogen concentration than that of the air in the introduction chamber (212), and a lower oxygen concentration and a lower carbon dioxide concentration than those of the air in the introduction chamber (212). The air having permeated the gas separation membranes (215) and then moved to the secondary exhaust chamber (214) has a lower nitrogen concentration than that of the air in the introduction chamber (212), a higher oxygen concentration and a higher carbon dioxide concentration than those of the air in the introduction chamber (212).

In the separation module (200), the air to be treated flows into the introduction chamber (212) from the inlet port (205). The air having flowed into the primary exhaust chamber (213) without permeating the gas separation membranes (215) flows out from the first outlet port (206) as the first air. The air having permeated the gas separation membranes (215) and then flowed into the secondary exhaust chamber (214) flows out from the second outlet port (207) as the second air.

—Operation of Inside Air Control Apparatus—The operations of the inside air control apparatus (100) will be described. The inside air control apparatus (100) performs various operations. Here, some of the operations performed by the inside air control apparatus (100) will be described. In first to seventh operations described below, the controller (180) sets the measurement on-off valve (156*a*) and the exhaust valve (161) to a closed state.

First Operation

The first operation is an operation of supplying the first air into the container and discharging the second air to the outside of the container, where both the outside air and the inside air are taken as the air to be treated. This first operation is performed to reduce the oxygen concentration of the air in the storage space (5).

Figure 6:
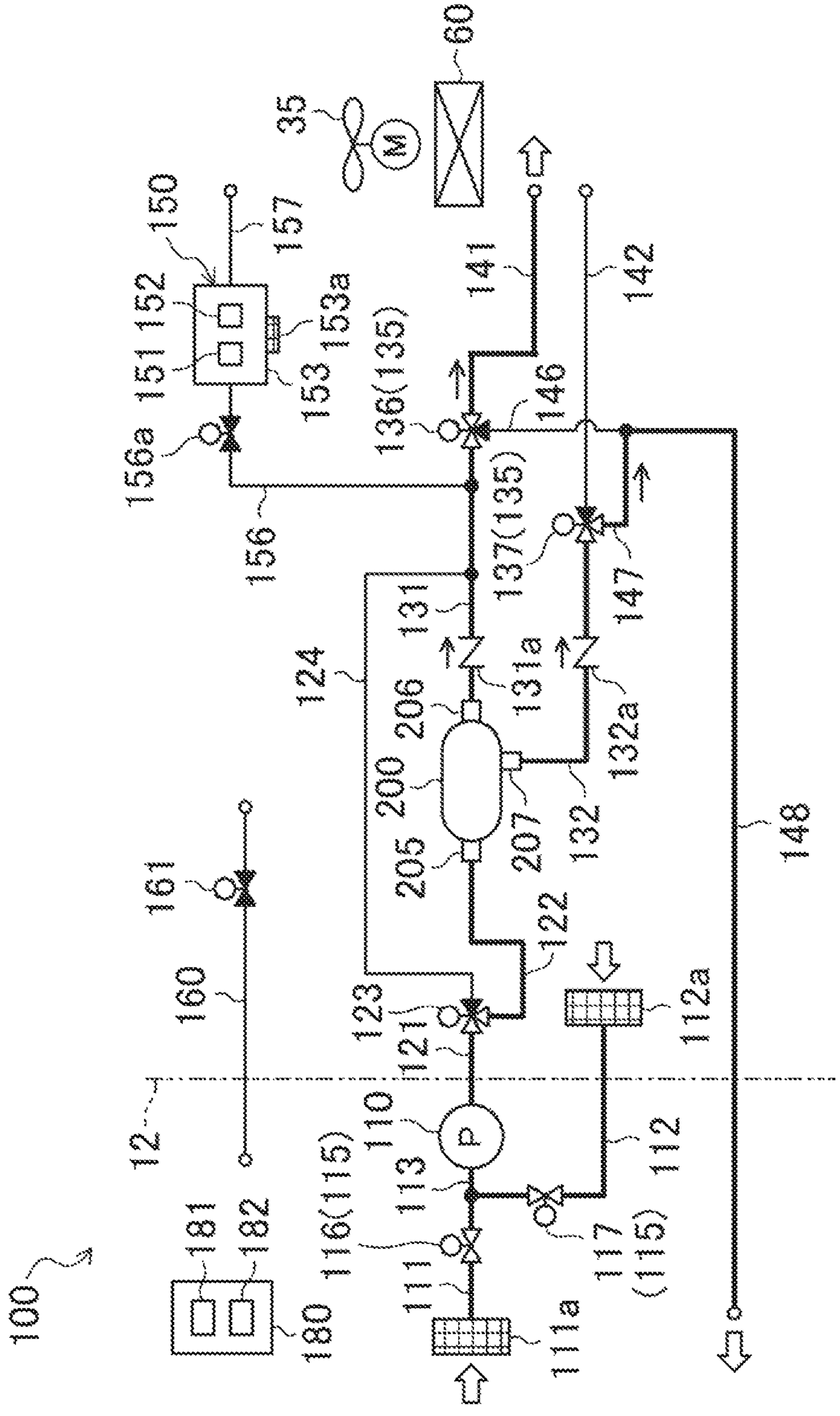
FIG. 6 is a diagram corresponding to FIG. 4 and showing a first operation of the inside air control apparatus of the first embodiment.

As illustrated in FIG. 6, in the first operation, the controller (180) sets the first valve (116) and the second valve (117) to an open state; sets the bypass switching valve (123) to the first state; sets the first switching valve (136) to the first state; and sets the second switching valve (137) to the second state.

The outside air flowing in the first inflow pipe (111) and the inside air flowing in the second inflow pipe (112) flow into the inflow trunk pipe (113) and mix with each other. Then, the mixed air is sucked into the air pump (110) as the air to be treated. The air pump (110) compresses and discharges the sucked air to be treated. The air to be treated which has been discharged from the air pump (110) flows into the separation module (200) through the first connection pipe (121) and the second connection pipe (122) in this order.

In the separation module (200), the air to be treated is separated into the first air and the second air. The first air having an oxygen concentration lower than that of the air to be treated is supplied to the internal flow path (20) through the first outflow pipe (131) and the first supply pipe (141) in this order. The second air having an oxygen concentration higher than that of the air to be treated is discharged to the external space through the second outflow pipe (132), the second discharge pipe (147), and the discharge trunk pipe (148) in this order.

In the first operation, the flow rate of the first air supplied to the inside of the container is greater than that of the second air discharged to the outside of the container. As a result, an air pressure in the storage space (5) becomes higher than an air pressure outside the transport container (1) (i.e., the atmospheric pressure). That is, the storage space (5) is maintained at a positive pressure.

<Second Operation>

The second operation is an operation of supplying the first air to the inside of the container and discharging the second air to the outside of the container, where the outside air is taken as the air to be treated. This second operation is performed to reduce the oxygen concentration of the air in the storage space (5).

Figure 7:
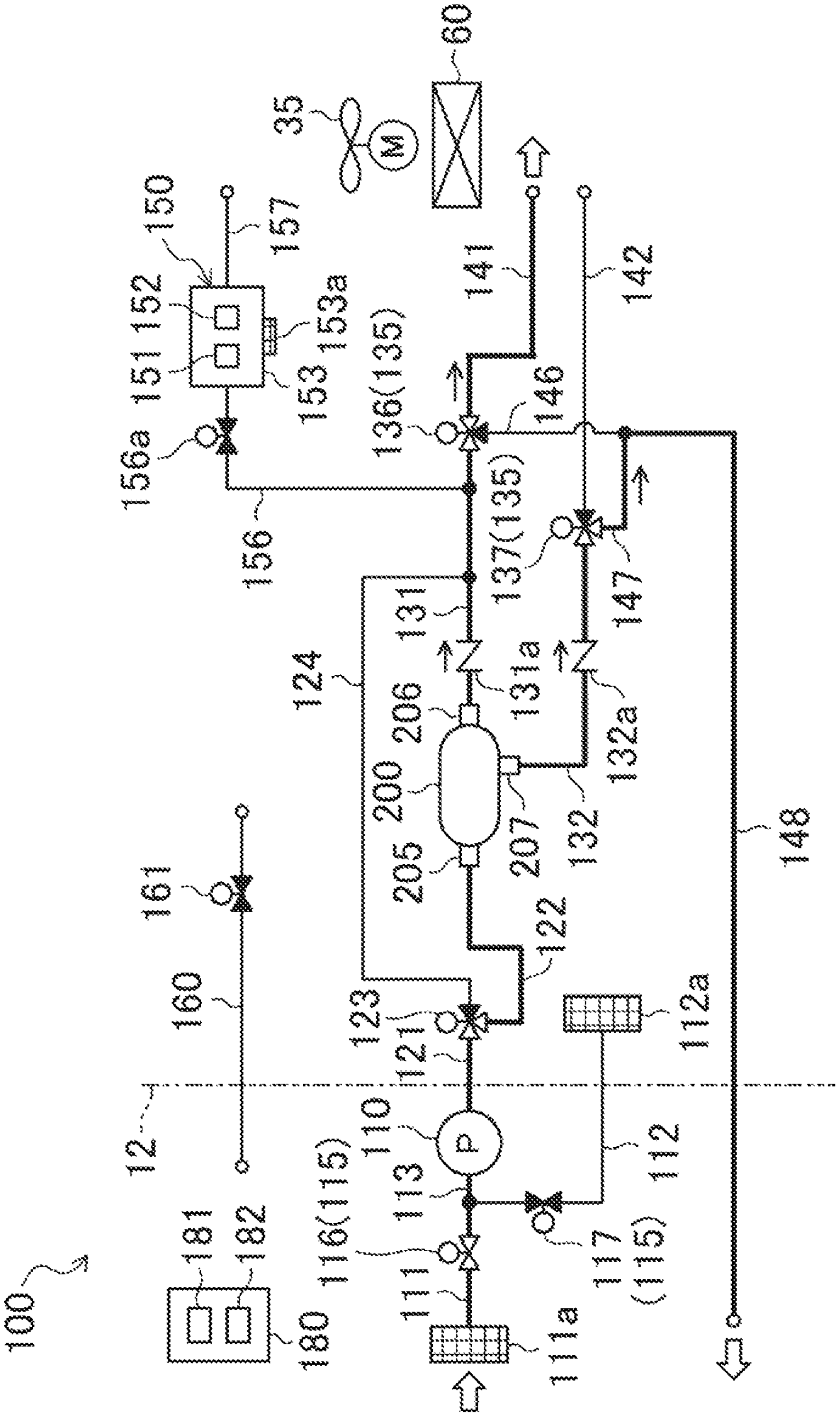
FIG. 7 is a diagram corresponding to FIG. 4 and showing a second operation of the inside air control apparatus of the first embodiment.

As illustrated in FIG. 7, in the second operation, the controller (180) sets the first valve (116) to the open state; sets the second valve (117) to the closed state; sets the bypass switching valve (123) to the first state; sets the first switching valve (136) to the first state; and sets the second switching valve (137) to the second state.

The outside air flowing in the first inflow pipe (111) is sucked into the air pump (110) as the air to be treated and is compressed therein. Then, the compressed air flows into the separation module (200). In the separation module (200), the air to be treated is separated into the first air and the second air. The first air having an oxygen concentration lower than that of the air to be treated is supplied to the internal flow path (20) through the first outflow pipe (131) and the first supply pipe (141) in this order. The second air having an oxygen concentration higher than that of the air to be treated is discharged to the external space through the second outflow pipe (132), the second discharge pipe (147), and the discharge trunk pipe (148) in this order.

<Third Operation>

The third operation is an operation of supplying the first air to the inside of the container and discharging the second air to the outside of the container, where the inside air is taken as the air to be treated. This third operation is performed to reduce the carbon dioxide concentration of the air in the storage space (5).

Figure 8:
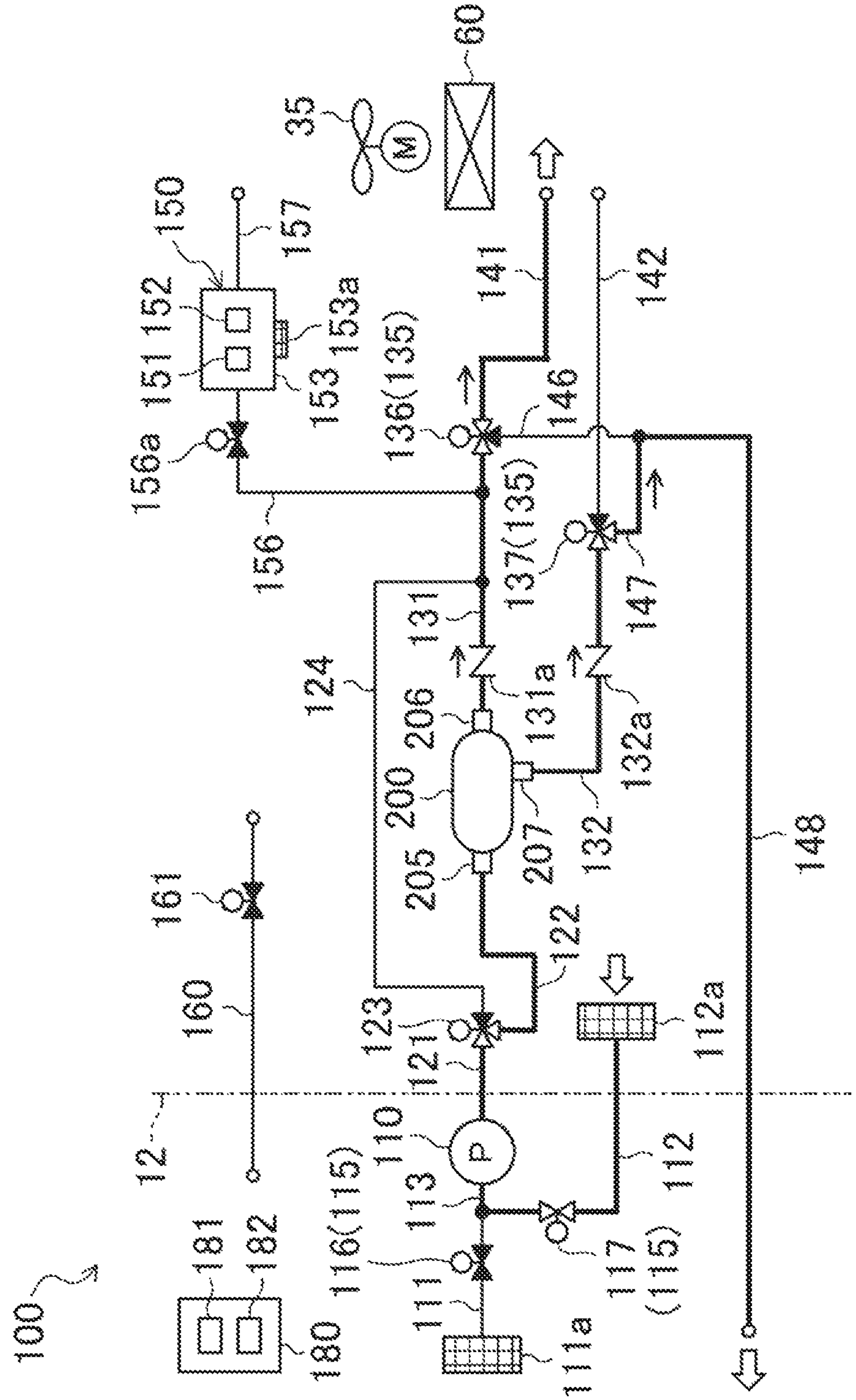
FIG. 8 is a diagram corresponding to FIG. 4 and showing a third operation of the inside air control apparatus of the first embodiment.

As illustrated in FIG. 8, in the third operation, the controller (180) sets the first valve (116) to the closed state; sets the second valve (117) to the open state; sets the bypass switching valve (123) to the first state; sets the first switching valve (136) to the first state; and sets the second switching valve (137) to the second state.

The inside air flowing in the second inflow pipe (112) is sucked into the air pump (110) as the air to be treated and is compressed therein. Then, the compressed air flows into the separation module (200). In the separation module (200), the air to be treated is separated into the first air and the second air. The first air having a carbon dioxide concentration lower than that of the air to be treated is supplied to the internal flow path (20) through the first outflow pipe (131) and the first supply pipe (141) in this order. The second air having a carbon dioxide concentration higher than that of the air to be treated is discharged to the external space through the second outflow pipe (132), the second discharge pipe (147), and the discharge trunk pipe (148) in this order.

<Fourth Operation>

The fourth operation is an operation of discharging the first air to the outside of the container and supplying the second air to the inside of the container, where both the outside air and the inside air are taken as the air to be treated. This fourth operation is performed to increase the oxygen concentration of the air in the storage space (5).

Figure 9:
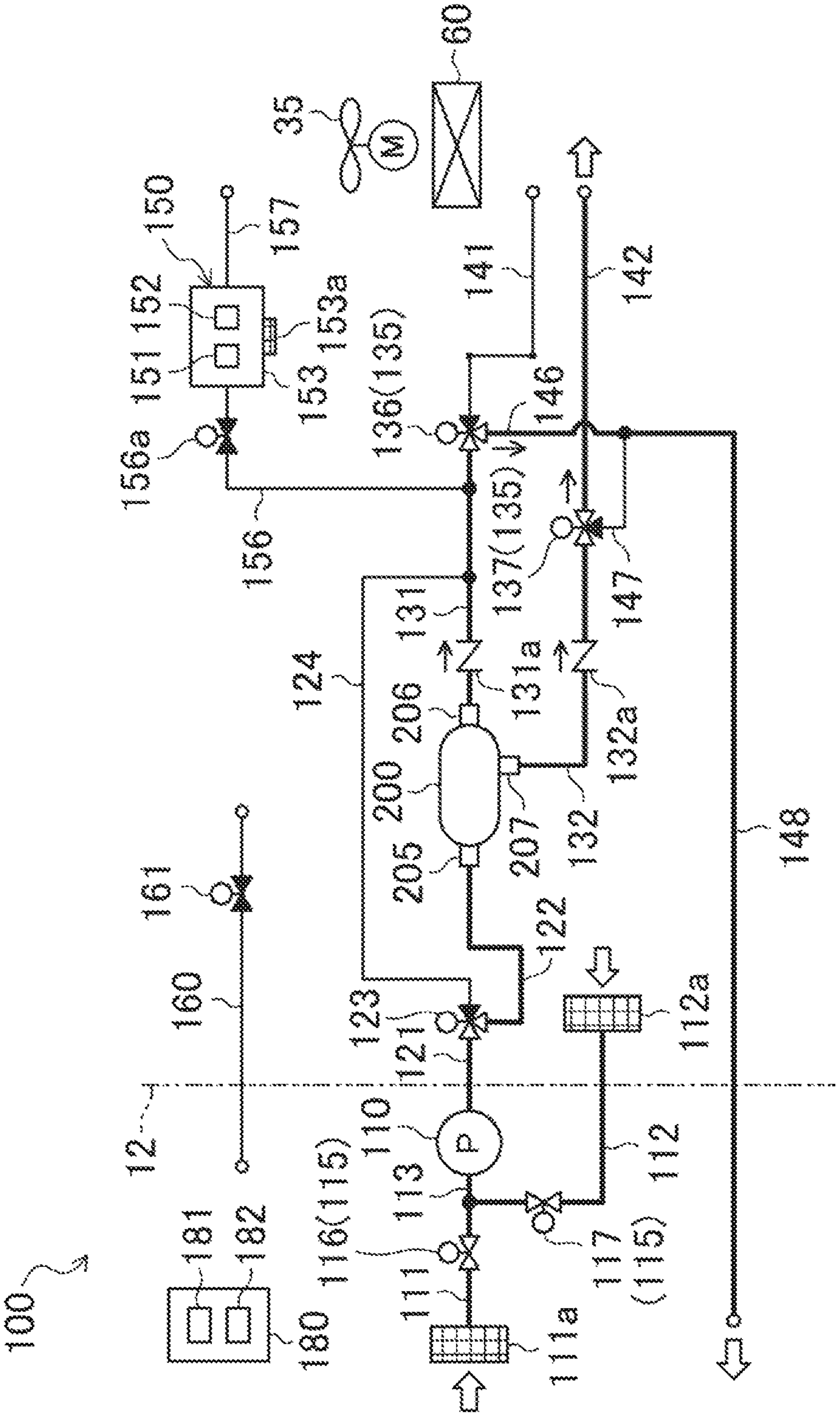
FIG. 9 is a diagram corresponding to FIG. 4 and showing a fourth operation of the inside air control apparatus of the first embodiment.

As illustrated in FIG. 9, in the fourth operation, the controller (180) sets the first valve (116) and the second valve (117) to the open state; sets the bypass switching valve (123) to the first state; sets the first switching valve (136) to the second state; and sets the second switching valve (137) to the first state.

The outside air flowing in the first inflow pipe (111) and the inside air flowing in the second inflow pipe (112) flows into the inflow trunk pipe (113) and mix with each other. Then mixed air is sucked into the air pump (110) as the air to be treated. The air pump (110) compresses and discharges the sucked air to be treated. The air to be treated which has been discharged from the air pump (110) flows into the separation module (200) through the first connection pipe (121) and the second connection pipe (122) in this order.

In the separation module (200), the air to be treated is separated into the first air and the second air. The first air having an oxygen concentration lower than that of the air to be treated is discharged to the external space through the first outflow pipe (131), the first discharge pipe (146), and the discharge trunk pipe (148) in this order. The second air having an oxygen concentration higher than that of the air to be treated is supplied to the internal flow path (20) through the second outflow pipe (132) and the second supply pipe (142) in this order.

In the fourth operation, the flow rate of the second air supplied to the inside of the container is greater than that of the first air discharged to the outside of the container. As a result, an air pressure in the storage space (5) becomes higher than an air pressure outside the transport container (1) (i.e., the atmospheric pressure). That is, the storage space (5) is maintained at a positive pressure.

<Fifth Operation>

The fifth operation is an operation of discharging the first air to the outside of the container and supplying the second air to the inside of the container, where the outside air is taken as the air to be treated. This fifth operation is performed to increase the oxygen concentration of the air in the storage space (5).

Figure 10:
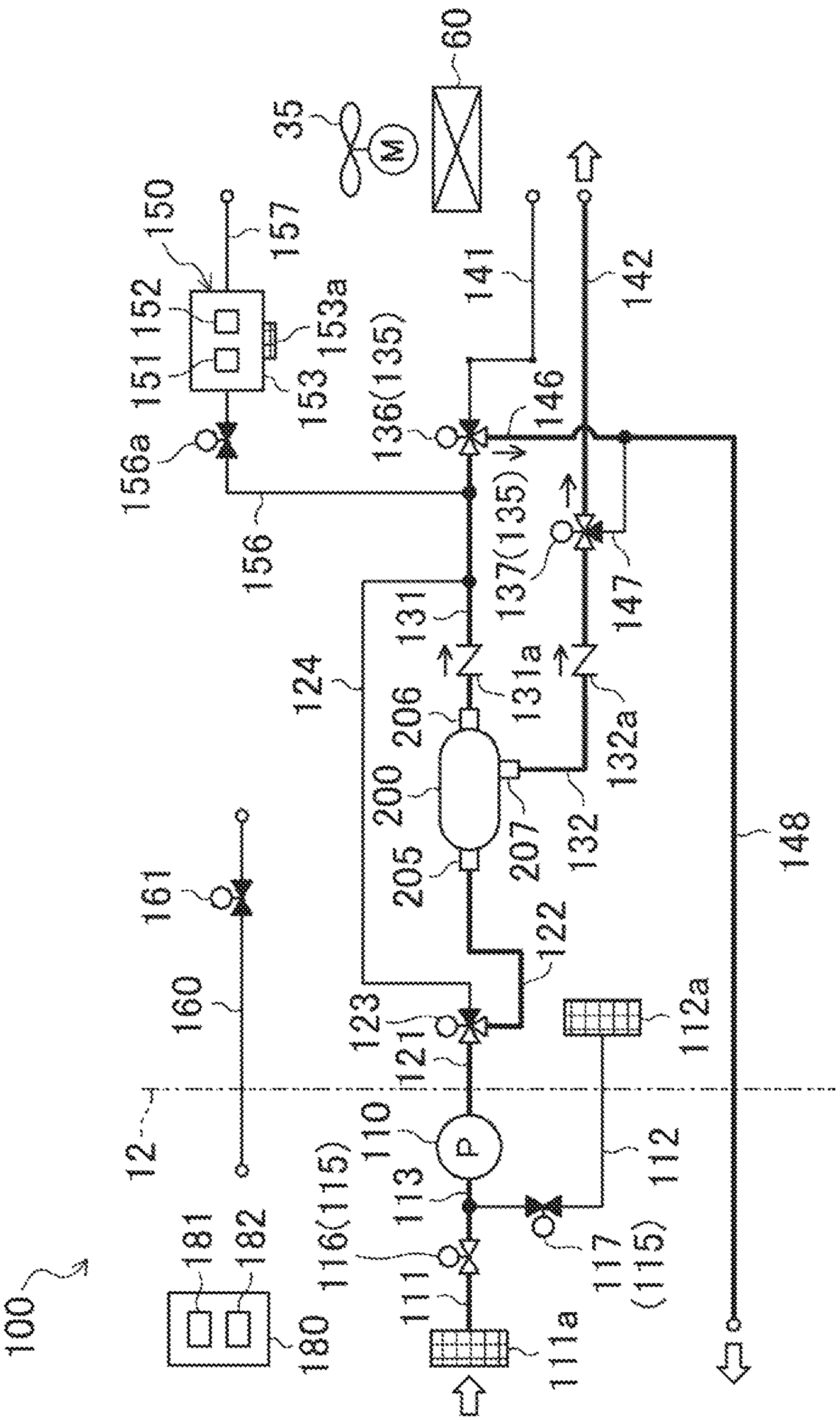
FIG. 10 is a diagram corresponding to FIG. 4 and showing a fifth operation of the inside air control apparatus of the first embodiment.

As illustrated in FIG. 10, in the fifth operation, the controller (180) sets the first valve (116) to the open state; sets the second valve (117) to the closed state; sets the bypass switching valve (123) to the first state; sets the first switching valve (136) to the second state; and sets the second switching valve (137) to the first state.

The outside air flowing in the first inflow pipe (111) is sucked into the air pump (110) as the air to be treated and is compressed therein. Then, the compressed air flows into the separation module (200). In the separation module (200), the air to be treated is separated into the first air and the second air. The first air having an oxygen concentration lower than that of the air to be treated is discharged to the external space through the first outflow pipe (131), the first discharge pipe (146), and the discharge trunk pipe (148) in this order. The second air having an oxygen concentration higher than that of the air to be treated is supplied to the internal flow path (20) through the second outflow pipe (132) and the second supply pipe (142) in this order.

<Sixth Operation>

The sixth operation is an operation of discharging the first air to the outside of the container and supplying the second air to the inside of the container, where the inside air is taken as the air to be treated. This sixth operation is performed to increase the carbon dioxide concentration of the air in the storage space (5).

Figure 11:
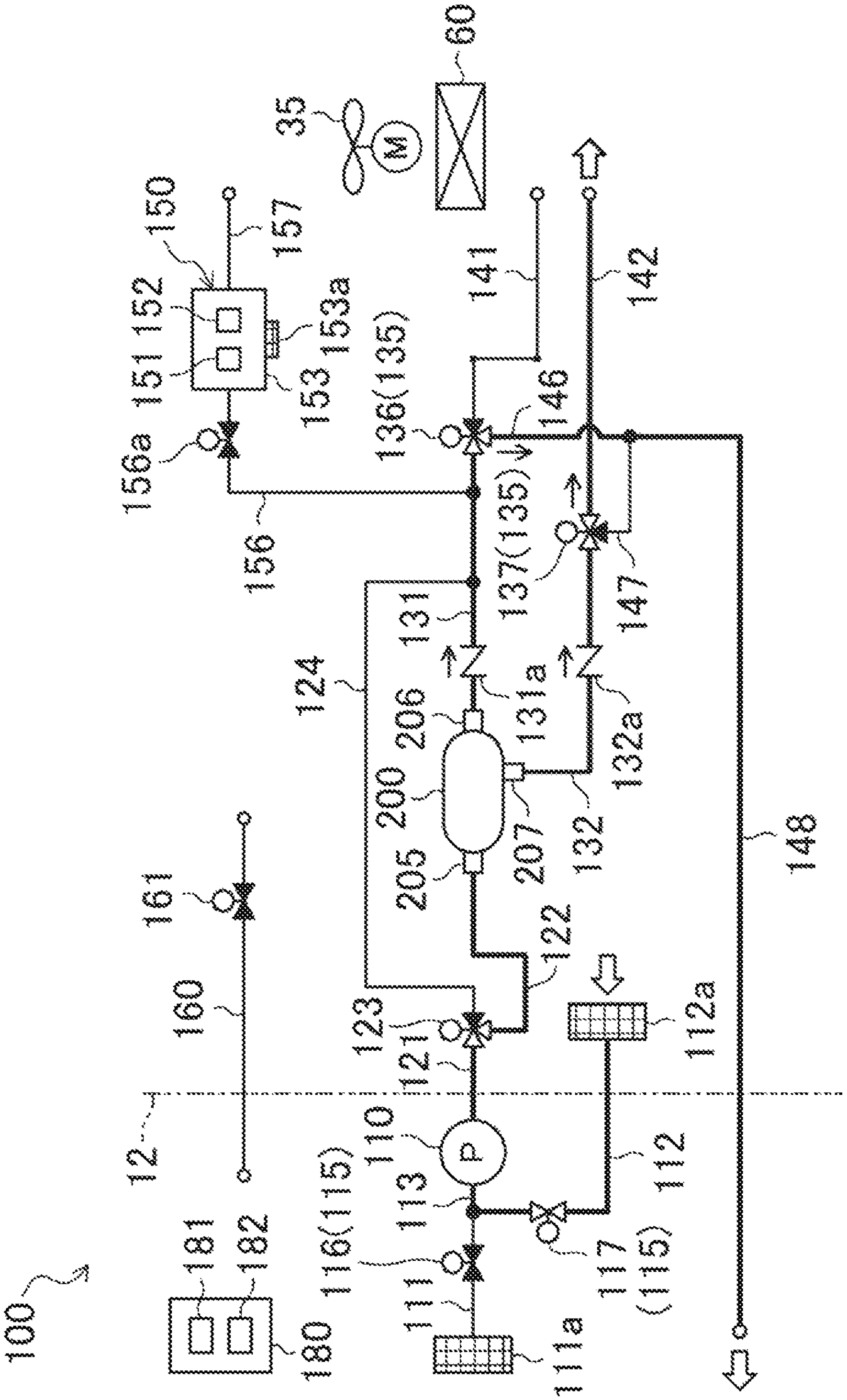
FIG. 11 is a diagram corresponding to FIG. 4 and showing a sixth operation of the inside air control apparatus of the first embodiment.

As illustrated in FIG. 11, in the sixth operation, the controller (180) sets the first valve (116) to the closed state; sets the second valve (117) to the open state; sets the bypass switching valve (123) to the first state; sets the first switching valve (136) to the second state; and sets the second switching valve (137) to the first state.

The inside air flowing in the first inflow pipe (111) is sucked into the air pump (110) as the air to be treated and is compressed therein. Then, the compressed air flows into the separation module (200). In the separation module (200), the air to be treated is separated into the first air and the second air. The first air having a carbon dioxide concentration lower than that of the air to be treated is discharged to the external space through the first outflow pipe (131), the first discharge pipe (146), and the discharge trunk pipe (148) in this order. The second air having a carbon dioxide concentration higher than that of the air to be treated is supplied to the internal flow path (20) through the second outflow pipe (132) and the second supply pipe (142) in this order.

<Seventh Operation>

The seventh operation is an operation of supplying the outside air directly to the inside of the container. This seventh operation is performed to increase the oxygen concentration of the air in the storage space (5).

Figure 12:
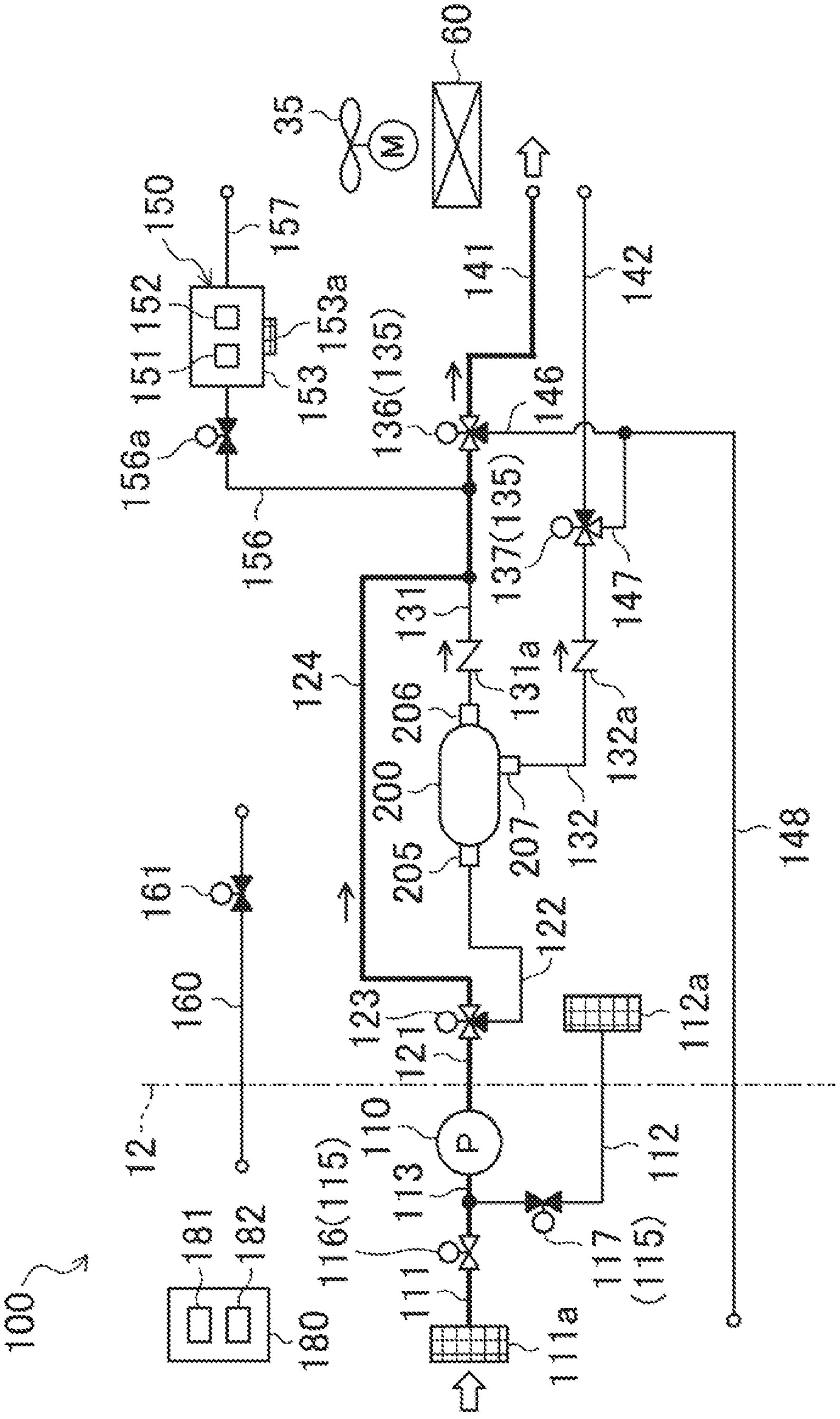
FIG. 12 is a diagram corresponding to FIG. 4 and showing a seventh operation of the inside air control apparatus of the first embodiment.

As illustrated in FIG. 12, in the seventh operation, the controller (180) sets the first valve (116) to the open state; sets the second valve (117) to the closed state; sets the bypass switching valve (123) to the second state; sets the first switching valve (136) to the first state; and sets the second switching valve (137) to the second state.

The outside air sucked into the air pump (110) from the first inflow pipe (111) is compressed and then discharged from the air pump (110). Then, the outside air flows into the bypass pipe (124). The outside air having flowed into the first outflow pipe (131) from the bypass pipe (124) is supplied to the internal flow path (20) through the first supply pipe (141).

<Exhaust Operation>

An exhaust operation is an operation of discharging the inside air to the outside of the transport container (1). This exhaust operation is performed as necessary when the first, second, fourth, fifth, or seventh operation is executed.

In the exhaust operation, the controller (180) sets the exhaust valve (161) to the closed state. When the first, second, fourth, fifth, or seventh operation is executed, the air pressure in the storage space (5) is higher than the air pressure outside the transport container (1) (i.e., the atmospheric pressure). That is, the storage space (5) is maintained at a positive pressure. Thus, when the exhaust valve (161) is opened, the inside air is discharged to the outside of the transport container (1) through the ventilation exhaust pipe (160). When the exhaust operation is executed, the air in the storage space (5) is gradually replaced with the air blown out from the first supply pipe (141).

First Feature of First Embodiment

In the inside air control apparatus (100) of this embodiment, both the outside air flowing in the first inflow path (111) and the inside air flowing in the second inflow path (112) can flow into the separation module (200). In the separation module (200), the first air and the second air having different compositions are generated. In the inside air control apparatus (100) of this embodiment, the separation module (200) can treat both the inside air and the outside air, and thus the configuration of the inside air control apparatus (100) is simplified.

Second Feature of First Embodiment

In the inside air control apparatus (100) of this embodiment, the outlet switching mechanism (135) changes the destinations of the first air and the second air. Thus, the inside air control apparatus (100) of this embodiment can switch between an operation of supplying the first air to the inside of the container and discharging the second air to the outside of the container and an operation of discharging the first air to the outside of the container and supplying the second air to the inside of the container.

Third Feature of First Embodiment

In the inside air control apparatus (100) of this embodiment, both the outside air flowing in the first inflow path (111) and the inside air flowing in the second inflow path (112) are sent to the separation module (200) by the single air pump (110). Thus, the configuration of the inside air control apparatus (100) is more simplified than when the first inflow pipe (111) and the second inflow pipe (112) are each provided with an air pump.

Fourth Feature of First Embodiment

In the inside air control apparatus (100) of this embodiment, the first valve (116) and the second valve (117) constituting the inlet switching mechanism are controlled by the controller (180). Then, the controller (180) controls the first valve (116) and the second valve (117), thereby switching among the state where the outside air flows into the separation module (200), the state where the inside air flows into the separation module (200), and the state where both the outside air and the inside air flow into the separation module (200).

Variations of First Embodiment

Variations of this embodiment will be described.

First Variation

In the inside air control apparatus (100) of this embodiment, each of the first valve (116) and the second valve (117) may be an electric valve having an adjustable opening degree. In this variation, the opening degrees of the first valve (116) and the second valve (117) are adjusted individually to change the ratio between the outside air and the inside air sucked into the air pump.

Second Variation

In the inside air control apparatus (100) of this embodiment, the inlet switching mechanism (115) may include a single three-way valve. The three-way valve of the inlet switching mechanism (115) is connected with the outlet end of the first inflow pipe (111), the outlet end of the second inflow pipe (112), and the inlet end of the inflow trunk pipe (113). The three-way valve of the inlet switching mechanism (115) switches among a state where the inflow trunk pipe (113) communicates with both the first inflow pipe (111) and the second inflow pipe (112); a state where the inflow trunk pipe (113) communicates with the first inflow pipe (111) and is disconnected from the second inflow pipe (112); and a state where the inflow trunk pipe (113) communicates with the second inflow pipe (112) and is disconnected from the first inflow pipe (111).

Second Embodiment

A transport container (1) of this embodiment has a modified configuration of the inside air control apparatus (100) of the transport container (1) of the first embodiment. Here, the inside air control apparatus (100) of this embodiment will be described in terms of differences from the inside air control apparatus (100) of the first embodiment.

Figure 13:
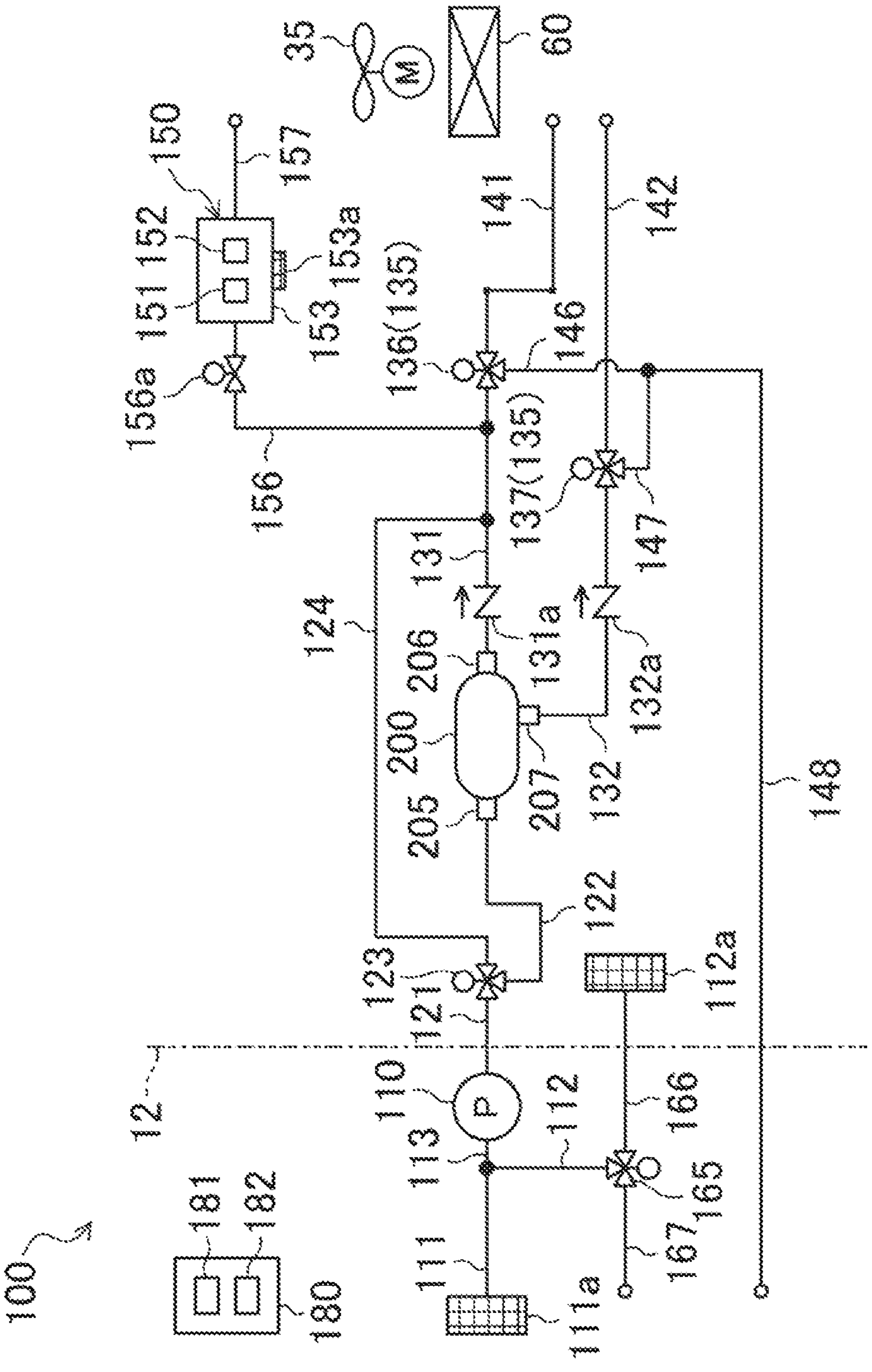
FIG. 13 is a piping system diagram showing a configuration of an inside air control apparatus of a second embodiment.

As illustrated in FIG. 13, the inside air control apparatus (100) of this embodiment includes an inside air switching valve (165), an inside air pipe (166), and an exhaust pipe (167). The inside air control apparatus (100) of this embodiment does not include the first valve (116) and the second valve (117) constituting the inlet switching mechanism (115), the ventilation exhaust pipe (160), and the exhaust valve (161).

<Second Inflow Pipe>

In the inside air control apparatus (100) of this embodiment, a second inflow pipe (112) has an inlet end connected to the inside air switching valve (165). The second inflow pipe (112) has an outlet end connected to the inlet end of the inflow trunk pipe (113) similarly to the first embodiment.

<Inside Air Pipe>

The inside air pipe (166) is a pipe for guiding the inside air to the inside air switching valve (165). The inside air pipe (166) serves as an inside air flow path.

The inside air pipe (166) has an inlet end opening to the inside of the division wall (12) (the internal space). The inlet end of the inside air pipe (166) is provided with the air filter (112*a*). In the inside air control apparatus (100) of this embodiment, the air filter (112*a*) is provided not at the inlet end of the second inflow pipe (112) but at the inlet end of the inside air pipe (166). The inlet end of the inside air pipe (166) communicates with the internal space through the air filter (112*a*). The inside air pipe (166) has an outlet end connected to the inside air switching valve (165).

<Exhaust Pipe>

The exhaust pipe (167) is a pipe for guiding the inside air to the outside of the transport container (1). The exhaust pipe (167) serves as an exhaust flow path.

The exhaust pipe (167) has an inlet end connected to the inside air switching valve (165). The exhaust pipe (167) has an outlet end communicating with the outside of the division wall (12) (the external space).

<Inside Air Switching Valve>

The inside air switching valve (165) is a three-way valve serving as a switching mechanism. As described above, the inside air switching valve (165) is connected with the second inflow pipe (112), the inside air pipe (166), and the exhaust pipe (167). The inside air switching valve (165) switches between a first state where the inside air pipe (166) communicates with the second inflow pipe (112) and is disconnected from the exhaust pipe (167) and a second state where the inside air pipe (166) communicates with the exhaust pipe (167) and is disconnected from the second inflow pipe (112).

Operation of Inside Air Control Apparatus

The operations of the inside air control apparatus (100) will be described. The inside air control apparatus (100) performs various operations. Here, some of the operations performed by the inside air control apparatus (100) will be described.

First Operation and Fourth Operation

The inside air control apparatus (100) of this embodiment performs operations equivalent to the first operation (see FIG. 6) and the fourth operation (see FIG. 9) of the inside air control apparatus (100) of the first embodiment. Here, the first and fourth operations performed by the inside air control apparatus (100) of this embodiment will be described in terms of differences from the first and fourth operations performed by the inside air control apparatus (100) of the first embodiment.

The inside air control apparatus (100) of this embodiment performs the first and fourth operations where the controller (180) sets the inside air switching valve (165) to the first state. As a result, the inside air pipe (166) communicates with the second inflow pipe (112) and is disconnected from the exhaust pipe (167). The inside air flowing in the inside air pipe (166) flows into the inflow trunk pipe (113) through the second inflow pipe (112), and is sucked into the air pump (110) together with the outside air flowing from the first inflow pipe (111) into the inflow trunk pipe (113).

<Exhaust Operation>

The inside air control apparatus (100) of this embodiment performs an exhaust operation. The inside air control apparatus (100) of this embodiment performs the exhaust operation as necessary when an operation equivalent to the second operation (see FIG. 7), the fifth operation (see FIG. 10), or the seventh operation (see FIG. 12) of the inside air control apparatus (100) of the first embodiment is executed.

The inside air control apparatus (100) of this embodiment performs the exhaust operation where the controller (180) sets the inside air switching valve (165) to the second state. As a result, the inside air pipe (166) communicates with the exhaust pipe (167) and is disconnected from the second inflow pipe (112). The states of the components of the inside air control apparatus (100) other than the inside air switching valve (165) are the same as those of the second, fifth, and seventh operations performed by the inside air control apparatus (100) of the first embodiment.

When the second, fifth or seventh operation is executed, the air pressure in the storage space (5) is higher than the air pressure outside the transport container (1) (i.e., the atmospheric pressure). That is, the storage space (5) is maintained at a positive pressure. Thus, when the inside air switching valve (165) is set to the second state, the inside air passes through the inside air pipe (166) and the exhaust pipe (167) in this order, and is discharged to the outside of the transport container (1). As a result, the air in the storage space (5) is gradually replaced with the air blown out from the first supply pipe (141).

Feature of Second Embodiment

In the inside air control apparatus (100) of this embodiment, the inside air pipe (166) is used for both an operation of sending the inside air to the air pump (110) and an operation of sending the inside air to the exhaust pipe (167). In this manner, in the inside air control apparatus (100) of this embodiment, part of the pipe for sending the inside air to the air pump (110) can be used as a flow path for discharging the inside air to the outside of the transport container (1). Thus, according to this embodiment, the structure of the inside air control apparatus (100) can be simplified.

Variation of Second Embodiment

In the inside air control apparatus (100) of this embodiment, the first inflow pipe (111) may be provided with the first valve (116). In this case, the first valve (116) and the inside air switching valve (165) constitutes the inlet switching mechanism (115).

Third Embodiment

A transport container (1) of this embodiment has a modified configuration of the inside air control apparatus (100) of the transport container (1) of the first embodiment. Here, the inside air control apparatus (100) of this embodiment will be described in terms of differences from the inside air control apparatus (100) of the first embodiment.

Figure 14:
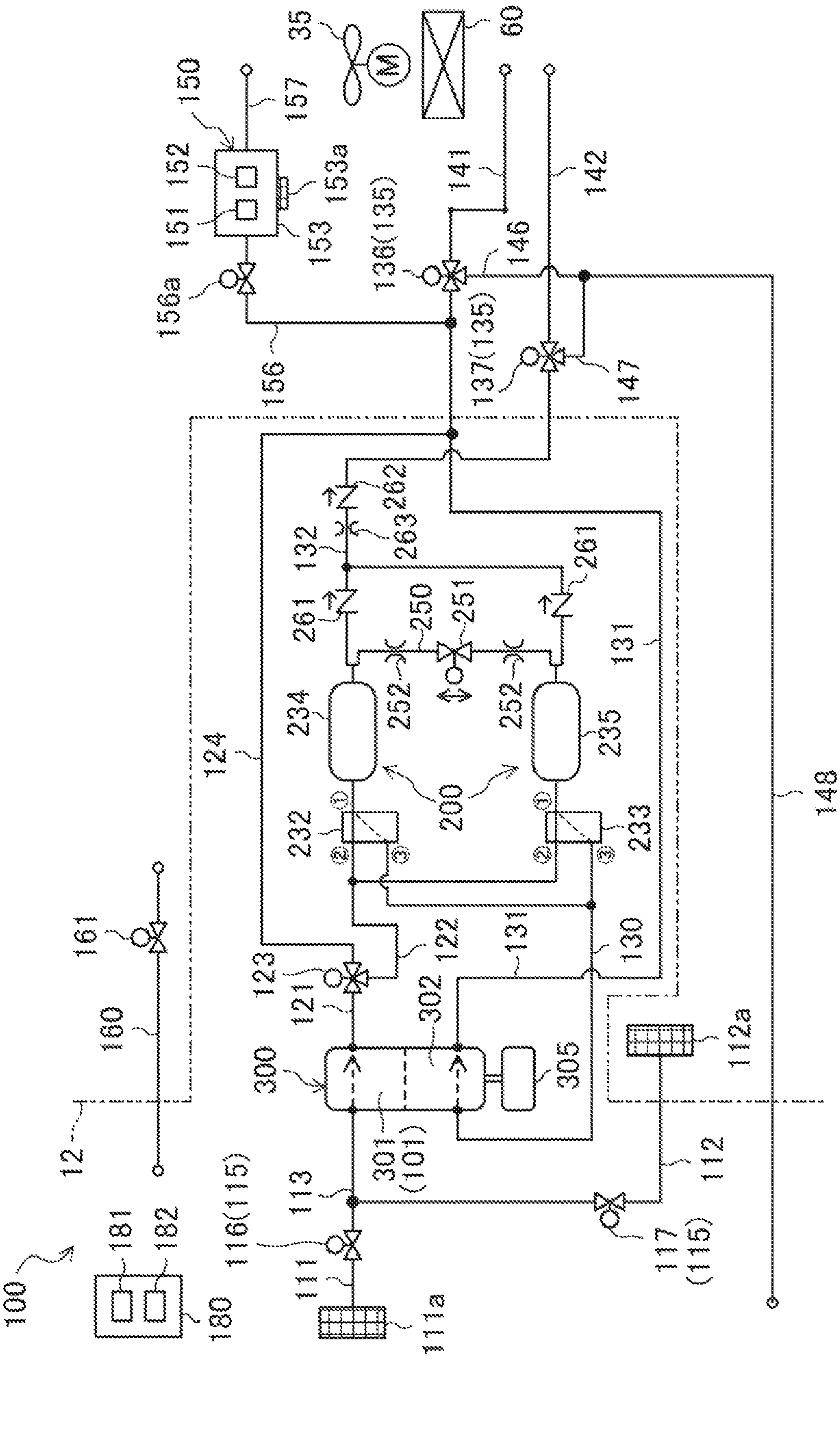
FIG. 14 is a piping system diagram showing a configuration of an inside air control apparatus of a third embodiment.

As illustrated in FIG. 14, in the inside air control apparatus (100) of this embodiment, a composition adjuster (200) includes a gas separation device of pressure swing adsorption (PSA) type. The composition adjuster (200) separates the air to be treated into first air having a nitrogen concentration higher than that of the air to be treated and an oxygen concentration lower than that of the air to be treated and second air having a nitrogen concentration lower than that of the air to be treated and an oxygen concentration higher than that of the air to be treated.

The composition adjuster (200) of this embodiment includes a first adsorption vessel (234), a second adsorption vessel (235), a first operation switching valve (232), and a second operation switching valve (233). The inside air control apparatus (100) of this embodiment includes a pump unit (300) instead of the air pump (110) of the first embodiment.

Although not illustrated in the drawing, the first adsorption vessel (234), the second adsorption vessel (235), the first operation switching valve (232), the second operation switching valve (233), and the pump unit (300) are housed in a unit case. The unit case housing these components is installed outside the division wall (12) of the transport refrigeration apparatus (10) (or, outside the container).

<Pump Unit>

The pump unit (300) includes an air supply pump (301), an exhaust pump (302), and a drive motor (305). The air supply pump (301) and the exhaust pump (302) each suck and discharge the air. The air supply pump (301) and the exhaust pump (302) are connected to a drive shaft of the single drive motor (305). In the pump unit (300), both the air supply pump (301) and the exhaust pump (302) are driven by the single drive motor (305).

The air supply pump (301) has a suction port connected to the other end of an inflow trunk pipe (113). The air supply pump (301) has a discharge port connected to one end of a first connection pipe (121). The air supply pump (301) compresses the air to be treated which has been sucked in from the inflow trunk pipe (113) and discharges the compressed air to be treated to the first connection pipe (121). The air supply pump (301) is an air supply (110) sending the sucked air to the composition adjuster (200).

The exhaust pump (302) has a suction port connected to a suction pipe (130). The exhaust pump (302) has a discharge port connected to a first outflow pipe (131). The exhaust pump (302) discharges the first air to the first outflow pipe (131), where the first air has been sucked in from the composition adjuster (200) through the suction pipe (130).

<Second Connection Pipe>

The second connection pipe (122) of this embodiment connects the bypass switching valve (123) with the first operation switching valve (232) and the second operation switching valve (233) of the composition adjuster (200). One end of the second connection pipe (122) is connected to the bypass switching valve (123) similarly to the first embodiment. The other end of the second connection pipe (122) branches into two branch pipes. One of the branch pipes is connected to the first operation switching valve (232), and the other one of the branch pipes is connected to the second operation switching valve (233).

<Suction Pipe>

The suction pipe (130) is a pipe for guiding, to the exhaust pump (302), the gas having flowed out from the first adsorption vessel (234) and the second adsorption vessel (235). One end of the suction pipe (130) is connected to the suction port of the exhaust pump (302). The other end of the suction pipe (130) branches into two branch pipes. One of the branch pipes is connected to the first operation switching valve (232), and the other one of the branch pipes is connected to the second operation switching valve (233).

<First Outflow Pipe>

The first outflow pipe (131) of this embodiment has an inlet end connected to the discharge port of the exhaust pump (302). The first outflow pipe (131) has an outlet end connected to the first switching valve (136) similarly to the first embodiment. The first outflow pipe (131) guides the first air discharged by the exhaust pump (302) to the first switching valve (136). The first outflow pipe (131) is a first outflow path in which the first air having flowed out from the composition adjuster (200) flows.

(Operation Switching Valve)

Each of the first operation switching valve (232) and the second operation switching valve (233) is a switching valve having three ports. Each of the first operation switching valve (232) and the second operation switching valve (233) is configured to switch between a first state where a first port communicates with a second port and is disconnected from a third port and a second state where the first port communicates with the third port and is disconnected from the second port.

The first port of the first operation switching valve (232) is connected to one end of the first adsorption vessel (234). The second port of the first operation switching valve (232) is connected to the branch pipe of the second connection pipe (122), and the third port of the first operation switching valve (232) is connected to the branch pipe of the suction pipe (130). The first operation switching valve (232) switches between a state where the first adsorption vessel (234) is connected to the air supply pump (301) and a state where the first adsorption vessel (234) is connected to the exhaust pump (302).

The first port of the second operation switching valve (233) is connected to one end of the second adsorption vessel (235). The second port of the second operation switching valve (233) is connected to the branch pipe of the second connection pipe (122), and the third port of the second operation switching valve (233) is connected to the branch pipe of the suction pipe (130). The second operation switching valve (233) switches between a state where the second adsorption vessel (235) is connected to the air supply pump (301) and a state where the second adsorption vessel (235) is connected to the exhaust pump (302).

<Adsorption Cylinder>

Each of the first adsorption vessel (234) and the second adsorption vessel (235) is a member including a cylindrical container and an adsorbent, where both ends of the cylindrical container are closed and the container is filled with the adsorbent.

The adsorbent with which the adsorption vessels (234, 235) is filled adsorbs nitrogen and water (water vapor) in the air to be treated in a compression state where the pressure is higher than an atmospheric pressure, and desorbs nitrogen and water in a decompression state where the pressure is lower than an atmospheric pressure. An example of the adsorbent having these properties includes porous zeolite having pores with a diameter smaller than that of nitrogen molecules (3.0 angstrom) and greater than that of oxygen molecules (2.8 angstrom). The adsorbent provided in the adsorption vessels (234, 235) adsorbs nitrogen and water (water vapor), which are components of the air to be treated.

<Second Outflow Pipe>

The inlet end of the second outflow pipe (132) of this embodiment branches into two branch pipes. One of the branch pipes is connected to the other end of the first adsorption vessel (234), and the other one of the branch pipes is connected to the other end of the second adsorption vessel (235). Each of the branch pipes of the second outflow pipe (132) is provided with a single check valve (261). The check valve (261) allows the air to flow in the direction of flow from the corresponding adsorption vessel (234, 235), and prevents the air from flowing in the reverse direction.

The outlet end of the second outflow pipe (132) is connected to the second switching valve (137) similarly to the first embodiment. The second outflow pipe (132) is a second outflow path in which the second air having flowed out from the composition adjuster (200) flows.

The second outflow pipe (132) has an assembly portion provided with a check valve (262) and an orifice (263). The check valve (262) is arranged closer to the other end of the second outflow pipe (132) with respect to the orifice (263). The check valve (262) allows the air to flow toward the other end of the second outflow pipe (132), and prevents the air from flowing in the reverse direction.

<Purge Pipe>

Each of the branch pipes of the second outflow pipe (132) is connected to a purge pipe (250). The purge pipe (250) has ends, one of which is connected to the branch pipe connected to the first adsorption vessel (234) and the other of which is connected to the branch pipe connected to the second adsorption vessel (235). The one end of the purge pipe (250) is connected between the first adsorption vessel (234) and the check valve (261). The other end of the purge pipe (250) is connected between the second adsorption vessel (235) and the check valve (261).

The purge pipe (250) is provided with a purge valve (251). The purge valve (251) is an on-off valve configured as an electromagnetic valve. The purge valve (251) is opened to equalize the pressures of the first adsorption vessel (234) and the second adsorption vessel (235). In the purge pipe (250), a single orifice (252) is provided on both sides of the purge valve (251).

<Controller>

The controller (180) of this embodiment controls the components of the inside air control apparatus (100) similarly to the first embodiment. This controller (180) controls the pump unit (300), the first operation switching valve (232), and the second operation switching valve (233).

—Operation of Inside Air Control Apparatus—

The operation of the inside air control apparatus (100) will be described. The inside air control apparatus (100) of this embodiment performs multiple operations including first to seventh operations, similarly to the first embodiment.

In each of the first to sixth operations, the inside air control apparatus (100) performs an operation of separating the air to be treated into the first air and the second air in the composition adjuster (200). Specifically, the inside air control apparatus (100) alternately and repeatedly performs each of a first separation operation and a second separation operation for a predetermined switching time Ts. The switching time Ts is set to, for example, 14 seconds. The controller (180) controls the first operation switching valve (232) and the second operation switching valve (233) to alternately perform the first separation operation and the second separation operation. In each separation operation, the air to be treated is separated into the first air and the second air in the composition adjuster (200).

First Separation Operation

Figure 15:
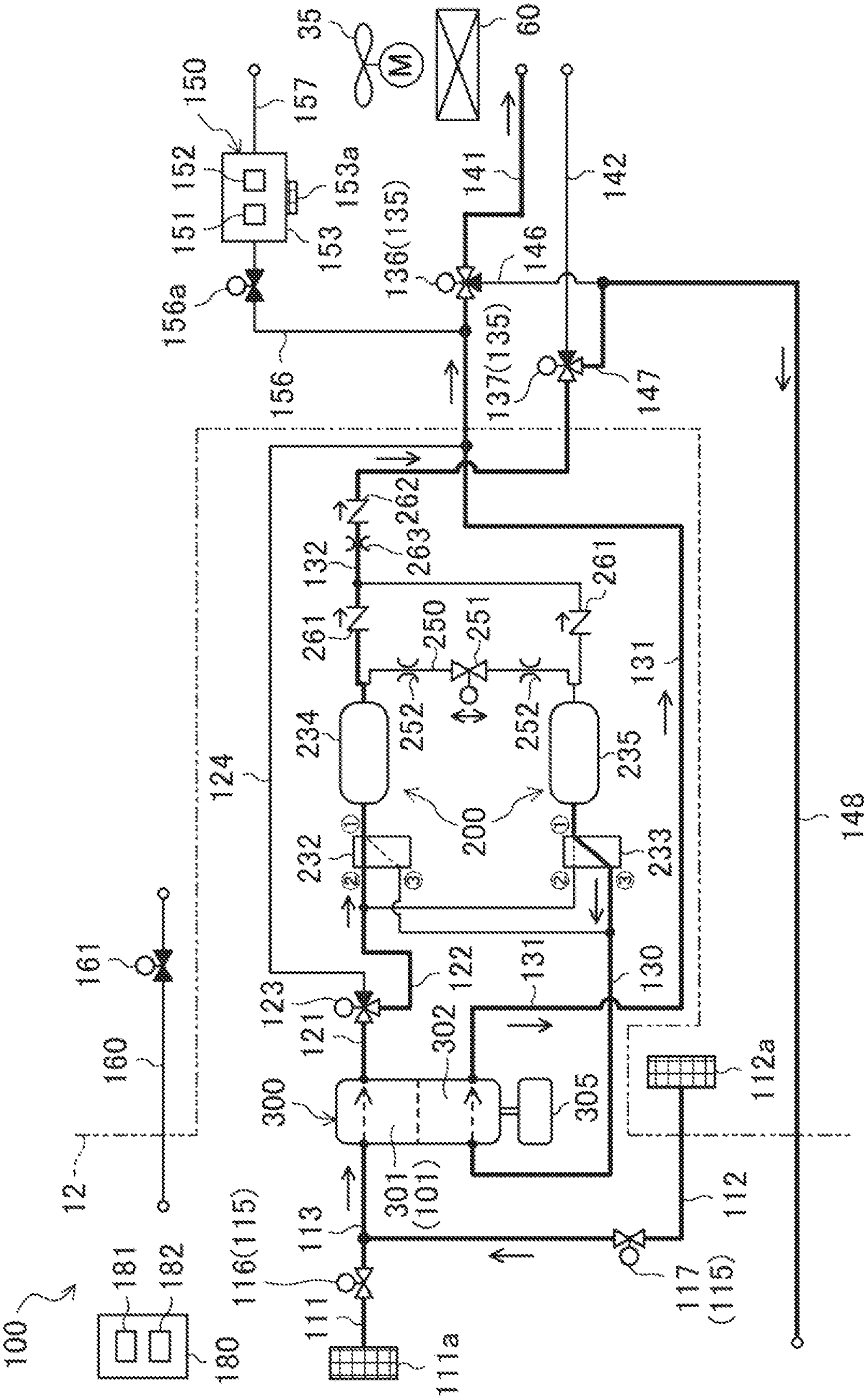
FIG. 15 is a diagram showing a first separation operation of the inside air control apparatus of the third embodiment and corresponding to FIG. 14.

As illustrated in FIG. 15, in the first separation operation, the first operation switching valve (232) is set to the first state, and the second operation switching valve (233) is set to the second state. In the first separation operation, the pump unit (300) operates to perform a compression operation for the first adsorption vessel (234) and a decompression operation for the second adsorption vessel (235). Note that FIG. 15 illustrates the first separation operation performed during the first operation.

The air supply pump (301) sucks the air to be treated from the inflow trunk pipe (113), compresses the sucked air to be treated, and supplies the compressed air to be treated to the first adsorption vessel (234). In the first adsorption vessel (234), the adsorbent adsorbs nitrogen and water contained in the supplied air to be treated. As a result, in the first adsorption vessel (234), oxygen-enriched gas is generated which has a nitrogen concentration lower than that of the air to be treated and an oxygen concentration higher than that of the air to be treated. This oxygen-enriched gas is the second air. The oxygen-enriched gas (the second air) flows from the first adsorption vessel (234) to the second outflow pipe (132).

Meanwhile, the exhaust pump (302) sucks gas from the second adsorption vessel (235). Then, the internal pressure of the second adsorption vessel (235) decreases, and nitrogen and water desorb from the adsorbent. As a result, in the second adsorption vessel (235), nitrogen-enriched gas is generated which has a nitrogen concentration higher than that of the air to be treated and an oxygen concentration lower than that of the air to be treated. This nitrogen-enriched gas is the first air. The nitrogen-enriched gas (the first air) flows out from the second adsorption vessel (235), and is sucked into the exhaust pump (302) through the suction pipe (130). The exhaust pump (302) compresses the sucked nitrogen-enriched gas (the first air), and discharges the compressed gas to the first outflow pipe (131).

Second Separation Operation

Figure 16:
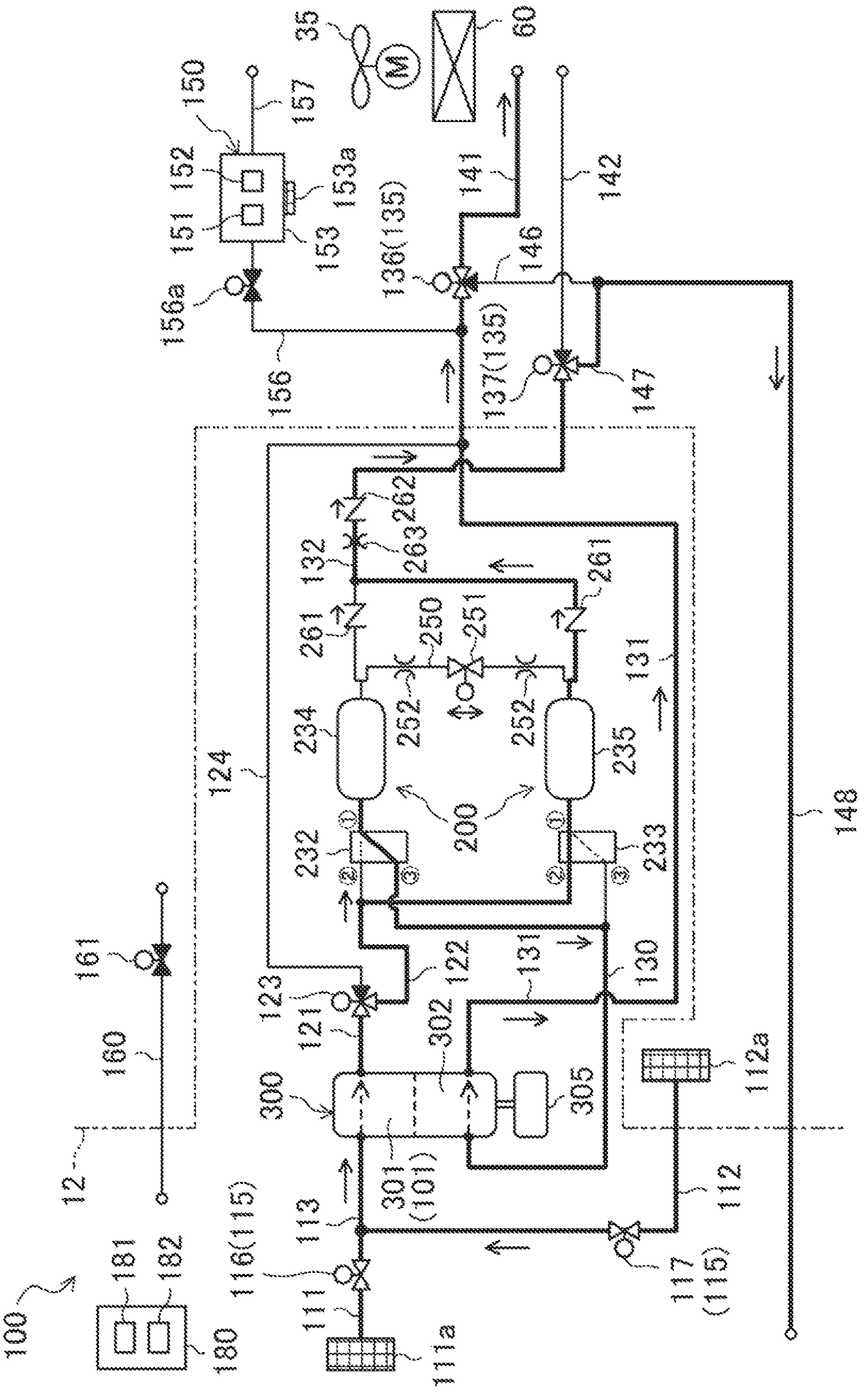
FIG. 16 is a diagram showing a second separation operation of the inside air control apparatus of the third embodiment and corresponding to FIG. 14.

As illustrated in FIG. 16, in the second separation operation, the first operation switching valve (232) is set to the second state, and the second operation switching valve (233) is set to the first state. In the second separation operation, the pump unit (300) operates to perform a decompression operation for the first adsorption vessel (234) and a compression operation for the second adsorption vessel (235). Note that FIG. 16 illustrates the second separation operation performed during the first operation.

The air supply pump (301) sucks the air to be treated from the inflow trunk pipe (113), compresses the sucked air to be treated, and supplies the compressed air to be treated to the second adsorption vessel (235). In the second adsorption vessel (235), the adsorbent adsorbs nitrogen and water (water vapor) contained in the supplied air to be treated. As a result, in the second adsorption vessel (235), oxygen-enriched gas is generated which has a nitrogen concentration lower than that of the air to be treated and an oxygen concentration higher than that of the air to be treated. This oxygen-enriched gas is the second air. The oxygen-enriched gas (the second air) flows from the second adsorption vessel (235) to the second outflow pipe (132).

Meanwhile, the exhaust pump (302) sucks gas from the first adsorption vessel (234). The internal pressure of the first adsorption vessel (234) decreases, and nitrogen and water desorb from the adsorbent. As a result, in the first adsorption vessel (234), nitrogen-enriched gas is generated which has a nitrogen concentration higher than that of the air to be treated and an oxygen concentration lower than that of the air to be treated. This nitrogen-enriched gas is the first air. The nitrogen-enriched gas (the first air) flows out from the first adsorption vessel (234), and is sucked into the exhaust pump (302) through the suction pipe (130). The exhaust pump (302) compresses the sucked nitrogen-enriched gas (the first air), and discharges the compressed gas to the first outflow pipe (131).

Other Embodiments

The Transport Container (1) and the Inside Air Control Apparatus (100) of the First and second embodiments may be modified as follows. The following variations may be combined or replaced as necessary as long as the functions of the transport container (1) and the inside air control apparatus (100) are not impaired.

First Variation

The inside air control apparatus (100) of the first or second embodiment may include a fan as an air supply instead of the air pump (110). The fan serving as an air supply blows, toward the separation module (200), the air sucked in from one or both of the first inflow pipe (111) and the second inflow pipe (112).

Second Variation

The transport container (1) of the above embodiments may be used for land transportation. In this case, the transport container (1) is conveyed by a land transporter such as a vehicle. Specifically, the transport container (1) may be mounted on a trailer.

While the embodiment and variations thereof have been described above, it will be understood that various changes in form and details may be made without departing from the spirit and scope of the claims. The foregoing embodiment and variations thereof may be combined or replaced with each other without deteriorating the intended functions of the present disclosure. The ordinal numbers such as "first" and "second" in the description and claims are used to distinguish the terms to which these expressions are given, and do not limit the number and order of the terms.

INDUSTRIAL APPLICABILITY

As can be seen from the foregoing description, the present disclosure is useful for an inside air control apparatus, a refrigeration apparatus, and a transport container.

DESCRIPTION OF REFERENCE CHARACTERS

1 Transport Container
2 Container Body (Storage)
10 Transport Refrigeration Apparatus (Refrigeration Apparatus)
30 Refrigerant Circuit
100 Inside Air Control Apparatus
110 Air Pump (Air Supply)
111 First Inflow Pipe (First Inflow Path)
112 Second Inflow Pipe (Second Inflow Path)
115 Inlet Switching Mechanism
116 First Valve
117 Second Valve
131 First Outflow Pipe (First Outflow Path)
132 Second Outflow Pipe (Second Outflow Path)
135 Outlet Switching Mechanism
165 Inside Air Switching Valve (Switching Mechanism)
166 Inside Air Pipe (Inside Air Flow Path)
167 Exhaust Pipe (Exhaust Flow Path)
180 Controller
200 Separation Module (Composition Adjuster)

The invention claimed is:

1. An inside air control apparatus for adjusting a composition of inside air in a storage, comprising:
   - a composition adjuster configured to separate inflow air to be treated into first air and second air having different compositions;

a first inflow path in which outside air outside the storage flows toward the composition adjuster;

a second inflow path in which the inside air flows toward the composition adjuster;

a first outflow path in which the first air having flowed out from the composition adjuster flows;

a second outflow path in which the second air having flowed out from the composition adjuster flows; and an outlet switching valve mechanism configured to switch between a state where the first outflow path communicates with an inside of the storage and the second outflow path communicates with an outside of the storage and a state where the second outflow path communicates with the inside of the storage and the first outflow path communicates with the outside of the storage, wherein the composition adjuster separates the air to be treated into the first air having a nitrogen concentration higher than that of the air to be treated and an oxygen concentration lower than that of the air to be treated and the second air having a nitrogen concentration lower than that of the air to be treated and an oxygen concentration higher than that of the air to be treated.

2. The inside air control apparatus of claim 1, further comprising:

an air supply configured to send, to the composition adjuster, air sucked in from the first inflow path and the second inflow path.

3. The inside air control apparatus of claim 1, further comprising:

a first valve provided on the first inflow path; and a second valve provided on the second inflow path.

4. The inside air control apparatus of claim 3, further comprising:

a controller configured to control the first valve and the second valve to switch among a state where the first valve is in an open state and the second valve is in a closed state, a state where the first valve is a closed state and the second valve is in an open state, and a state where the first valve and the second valve are in an open state.

5. The inside air control apparatus of claim 3, wherein each of the first valve and the second valve is a control valve having a variable opening degree.

6. The inside air control apparatus of claim 1, further comprising:

an inlet switching valve mechanism configured to switch among a state where the composition adjuster communicates with the first inflow path and is disconnected from the second inflow path, a state where the composition adjuster communicates with the second inflow path and is disconnected from the first inflow path, and a state where the composition adjuster communicates with the first inflow path and the second inflow path.

7. The inside air control apparatus of claim 1, further comprising:

a switching mechanism configured to switch between a state where the inside air is sent to the second inflow path and a state where the inside air is discharged to the outside of the storage.

8. The inside air control apparatus of claim 7, further comprising:

an inside air flow path having ends, one of which communicates with the inside of the storage; and an exhaust flow path having ends, one of which communicates with the outside of the storage, wherein the switching mechanism is a three-way valve connected to the second inflow path, the inside air flow path, and the exhaust flow path, and switching between a state where the inside air flow path communicates with the second inflow path and a state where the inside air flow path communicates with the exhaust flow path.

9. A refrigeration apparatus comprising:

the inside air control apparatus of claim 1; and a refrigerant circuit configured to perform a refrigeration cycle to adjust an internal temperature of the storage.

10. A transport container comprising:

the refrigeration apparatus of claim 9; and a container body provided with the refrigeration apparatus and serving as the storage.

* * * * *